US011675773B2

(12) United States Patent
Soini et al.

(10) Patent No.: US 11,675,773 B2
(45) Date of Patent: Jun. 13, 2023

(54) CONTENT MANAGEMENT

(71) Applicant: T-Mobile USA, Inc., Bellevue, WA (US)

(72) Inventors: Jonathan Soini, Seattle, WA (US); Tyler Axdorff, Seattle, WA (US); Senthil Kumar Mulluppadi Velusamy, Redmond, WA (US); Emily James, Lake Stevens, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 524 days.

(21) Appl. No.: 16/749,852

(22) Filed: Jan. 22, 2020

(65) Prior Publication Data
US 2021/0224246 A1     Jul. 22, 2021

(51) Int. Cl.
*G06F 16/00* (2019.01)
*G06F 16/23* (2019.01)
*G06F 16/26* (2019.01)
*G06N 5/02* (2023.01)
*G06F 16/22* (2019.01)
*G06F 16/28* (2019.01)

(52) U.S. Cl.
CPC ...... *G06F 16/2358* (2019.01); *G06F 16/2282* (2019.01); *G06F 16/26* (2019.01); *G06F 16/284* (2019.01); *G06N 5/027* (2013.01)

(58) Field of Classification Search
None
See application file for complete search history.

(56) References Cited

U.S. PATENT DOCUMENTS

| 8,090,794 | B1 | 1/2012 | Kilat et al. |
| 8,613,108 | B1 * | 12/2013 | Aggarwal ............... G06F 21/10 455/411 |
| 9,032,359 | B1 | 5/2015 | Ahmad et al. |
| (Continued) | | | |

OTHER PUBLICATIONS

De Vaere, Piet, "LIAM: An Architectural Framework for Decentralized IoT Networks", 2019 IEEE 16th International Conference on Mobile Ad Hoc and Sensor Systems (MASS), 12 pages. (Year: 2019).

(Continued)

*Primary Examiner* — Debbie M Le
(74) *Attorney, Agent, or Firm* — Han Santos, PLLC

(57) ABSTRACT

A content management system may support a card engine to dynamically perform operations such as configuring content for display via a user interface and generating reports based on user behavior, account status, and business logic. In cooperation with a facts controller to provide facts that the card engine may access substantively in real time, a rules engine to provide constructs in the form of card definitions, and a development engine, the content management system may enable a content manager to effect changes to card and container definitions by providing or modifying rules and rulesets in the rules engine dynamically. Cards evaluated dynamically by the card engine may be transmitted to user equipment. In this way, the content manager may make content decisions in accordance with business logic and events occurring proximate to the user, thereby impacting the user experience and generating reports in a substantive and real-time fashion.

18 Claims, 26 Drawing Sheets

(56) References Cited

U.S. PATENT DOCUMENTS

| | | | |
|---|---|---|---|
| 9,069,578 B2 | 6/2015 | Singh et al. | |
| 9,410,815 B1 | 8/2016 | Hirano et al. | |
| 9,619,805 B1 | 4/2017 | Carr et al. | |
| 9,684,882 B2 | 6/2017 | Azmoon | |
| 9,817,952 B2 * | 11/2017 | Cholas | G06Q 30/0633 |
| 9,864,963 B2 | 1/2018 | Cronin et al. | |
| 9,886,565 B2 * | 2/2018 | Nielsen | G06F 21/6218 |
| 10,032,200 B2 | 7/2018 | Beck | |
| 10,073,589 B1 | 9/2018 | Jesensky et al. | |
| 10,254,928 B1 | 4/2019 | Jesensky et al. | |
| 10,257,196 B2 * | 4/2019 | Dang | H04L 63/101 |
| 10,402,460 B1 | 9/2019 | Jesensky et al. | |
| 10,482,231 B1 * | 11/2019 | Harding | G06F 21/33 |
| 10,505,875 B1 | 12/2019 | Jenks et al. | |
| 10,536,551 B2 | 1/2020 | Debald et al. | |
| 10,599,839 B2 | 3/2020 | Hailpern et al. | |
| 10,922,640 B2 | 2/2021 | Sarferaz | |
| 11,063,927 B1 | 7/2021 | Mukesh et al. | |
| 2003/0160815 A1 | 8/2003 | Muschetto | |
| 2005/0021651 A1 | 1/2005 | Fellenstein et al. | |
| 2007/0231776 A1 | 10/2007 | Saldutti | |
| 2010/0211872 A1 | 8/2010 | Rolston et al. | |
| 2010/0293385 A1 | 11/2010 | Nanda et al. | |
| 2011/0137959 A1 * | 6/2011 | Kerer | G06F 16/9024 707/812 |
| 2012/0131476 A1 | 5/2012 | Mestres et al. | |
| 2012/0167185 A1 | 6/2012 | Menezes et al. | |
| 2013/0339600 A1 | 12/2013 | Shah | |
| 2014/0098102 A1 | 4/2014 | Raffle et al. | |
| 2014/0337730 A1 | 11/2014 | King et al. | |
| 2014/0359720 A1 | 12/2014 | Wray | |
| 2015/0100892 A1 | 4/2015 | Cronin et al. | |
| 2015/0100893 A1 | 4/2015 | Cronin et al. | |
| 2015/0324271 A1 | 11/2015 | Glass et al. | |
| 2016/0103805 A1 | 4/2016 | Greenberg et al. | |
| 2016/0124934 A1 | 5/2016 | Greenberg et al. | |
| 2016/0357674 A1 | 12/2016 | Waldspurger et al. | |
| 2017/0017634 A1 | 1/2017 | Levine et al. | |
| 2017/0103327 A1 | 4/2017 | Penilla et al. | |
| 2017/0139890 A1 | 5/2017 | Bendig et al. | |
| 2017/0168777 A1 | 6/2017 | Britt | |
| 2017/0289197 A1 | 10/2017 | Mandyam et al. | |
| 2017/0346804 A1 | 11/2017 | Beecham | |
| 2018/0096024 A1 * | 4/2018 | Bitting | G06F 16/2379 |
| 2018/0097767 A1 | 4/2018 | Ragsdale et al. | |
| 2018/0152845 A1 | 5/2018 | Unnerstall et al. | |
| 2018/0174229 A1 | 6/2018 | Sherwin et al. | |
| 2018/0308141 A1 | 10/2018 | Beck | |
| 2018/0351943 A1 | 12/2018 | Yasukawa et al. | |
| 2019/0191218 A1 | 6/2019 | Cormican et al. | |
| 2019/0312730 A1 | 10/2019 | Engan et al. | |
| 2019/0372993 A1 | 12/2019 | Dunjic et al. | |
| 2020/0045541 A1 | 2/2020 | Kreishan | |
| 2020/0143102 A1 | 5/2020 | Ziraknejad et al. | |
| 2020/0153831 A1 | 5/2020 | Baer et al. | |
| 2020/0169549 A1 | 5/2020 | Smith | |
| 2020/0192790 A1 | 6/2020 | Elges | |
| 2020/0251111 A1 | 8/2020 | Temkin et al. | |
| 2020/0259652 A1 | 8/2020 | Schmaltz, III et al. | |
| 2020/0334151 A1 | 10/2020 | Soini et al. | |
| 2020/0334217 A1 | 10/2020 | Soini et al. | |
| 2020/0334547 A1 | 10/2020 | Soini et al. | |
| 2020/0336309 A1 | 10/2020 | Wang et al. | |
| 2020/0349060 A1 | 11/2020 | Mestres et al. | |
| 2021/0042764 A1 | 2/2021 | Rungta et al. | |
| 2021/0051098 A1 | 2/2021 | Liu | |
| 2021/0224044 A1 | 7/2021 | Soini et al. | |

OTHER PUBLICATIONS

Joohwan Park et al. "Development of a web-based user experience evaluation system for home appliances"; International Journal of Industrial Ergonomics 67 (2018) 216-228.

Nicholas Caporusso et al. "A Digital Platform for Improving Accessibility in Physical User Interfaces"; 2020 the 6th IEEE International Conference on Information Management; IEEE.

U.S. Appl. No. 16/749,817, Notice of Allowance dated Apr. 20, 2022, 34 pages.

U.S. Appl. No. 16/749,840, Notice of Allowance dated Jan. 31, 2022, 134 pages.

U.S. Appl. No. 16/389,528, Ex Parte Quayle mailed Dec. 24, 2020, 29 pages.

U.S. Appl. No. 16/389,542, Non-Final Office Action dated Sep. 16, 2020, 46 pages.

U.S. Appl. No. 16/749,840, Final Office Action dated Oct. 7, 2021, 37 pages.

U.S. Appl. No. 16/389,528, Corrected Notice of Allowability dated Apr. 21, 2021, 26 pages.

U.S. Appl. No. 16/389,528, Notice of Allowance dated Apr. 5, 2021, 23 pages.

U.S. Appl. No. 16/749,840, Non-Final Office Action dated May 10, 2021, 37 pages.

U.S. Appl. No. 16/389,528, Corrected Notice of Allowability dated Jul. 8, 2021, 35 pages.

U.S. Appl. No. 16/389,528, Notice of Allowance dated Jun. 16, 2021, 35 pages.

U.S. Appl. No. 16/749,817, Final Office Action dated Dec. 16, 2021, 29 pages.

Watt, Ruaridh, "Proof-of-Possession Tokens in Microservice Architectures", MSc Computer Science Thesis, Jan. 26, 2018, pp. 1-44. (Year: 2018).

Substantive | Definition of Substantive by Merriam-Webster. (article) [online]. Merriam-Webster.com. Archived Mar. 13, 2018. Retrieved on Feb. 17, 2021. https://www.merriam-webster.com/dictionary/substantive (Year: 2018).

U.S. Appl. No. 16/389,542, Final Office Action dated Mar. 3, 2021, 57 pages.

U.S. Appl. No. 16/749,840, Restriction Requirement dated Feb. 25, 2021, 6 pages.

U.S. Appl. No. 16/749,817, Office Action dated Aug. 6, 2021, 29 pages.

U.S. Appl. No. 16/389,520, Office Action dated Aug. 1, 2022, 84 pages.

U.S. Appl. No. 16/749,817, Notice of Allowance dated Jul. 5, 2022, 39 pages.

U.S. Appl. No. 16/749,840, Notice of Allowance dated May 9, 2022, 71 pages.

U.S. Appl. No. 16/749,840, Notice of Allowance dated Jun. 28, 2022, 71 pages.

U.S. Appl. No. 16/389,520, Notice of Allowance dated Jan. 25, 2023, 57 pages.

* cited by examiner

FIG. 16

| | https://content-engine-admin.corporate.com | |
|---|---|---|
| HOME | CONTENT BLOCKS > Cell X9 Offer Q418 Card | DELETE BLOCK |
| CONTENT BLOCKS | | |
| CONTAINERS | CONTENT SUMMARY / VARIANTS | |
| MEDIA | | |
| CALLS TO ACTION | Variant | Trigger | Audiences | Payloads | CTAs | Template | Weight |
| RULESETS | variant_1 | $customer.type == 'postpaid' | tmo_app | EN, ES | cta_id_1<br>cti_id_xyz | my_template | 100 |
| VERSIONS | variant_2 | $customer.type == 'prepaid' | tmo_app | EN, ES<br>EN, ES | cta_id_2<br>cta_id_abc | my_template | 110 |
| PUBLISHING | variant_3 | $customer.type == 'unknown' | tmo_app | EN, ES | cta_id_5<br>cti_id_ert | my_template | 200 |
| SIMULATOR | variant_4 | $customer.type == 'minor' | tmo_app | EN, ES | cta_id_1<br>cta_id_xyz | my_template | 100 |
| ADMIN TOOLS | | | | | | | |

FIG. 18

CONTENT MANAGEMENT

CROSS-REFERENCE TO RELATED APPLICATIONS

The present application is related to U.S. patent application Ser. No. 16/389,520 filed on Apr. 19, 2019; Ser. No. 16/389,528 filed on Apr. 19, 2019; Ser. No. 16/389,542 filed on Apr. 19, 2019; Ser. No. 16/749,840 filed on Jan. 22, 2020; and Ser. No. 16/749,817 filed on Jan. 22, 2020. The entire contents of these patent applications are incorporated herein by this reference.

BACKGROUND

Mobile consumers demand a high degree of relevance of content presented via their smartphones and other mobile network client devices (collectively known as "user equipment"). Correspondingly, mobile network providers and their content providers demand a high degree of control in presenting content to mobile consumers.

Developers try to enable the demanded high degree of control but are hampered by the form factor of user equipment. For example, some user equipment, such as smartphones, may have a relatively small amount of screen space. User equipment also often have a relatively limited amount of physical and virtual controllers to provide user input, compared to other devices, and in many cases are limited to a touch screen.

Regardless of form factor, content control involves a high degree of complexity in the editing of rules, content transforms and/or messages. In addition, the challenge of content management is in proportion to the complexity of content control.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 16 illustrates an example of the developer interface screen that may be displayed in response to developer selection of the control "display until eligibility" in a given content block.

FIG. 18 illustrates an example of a developer interface screen with the variants tab selected.

DETAILED DESCRIPTION

Figure 1:
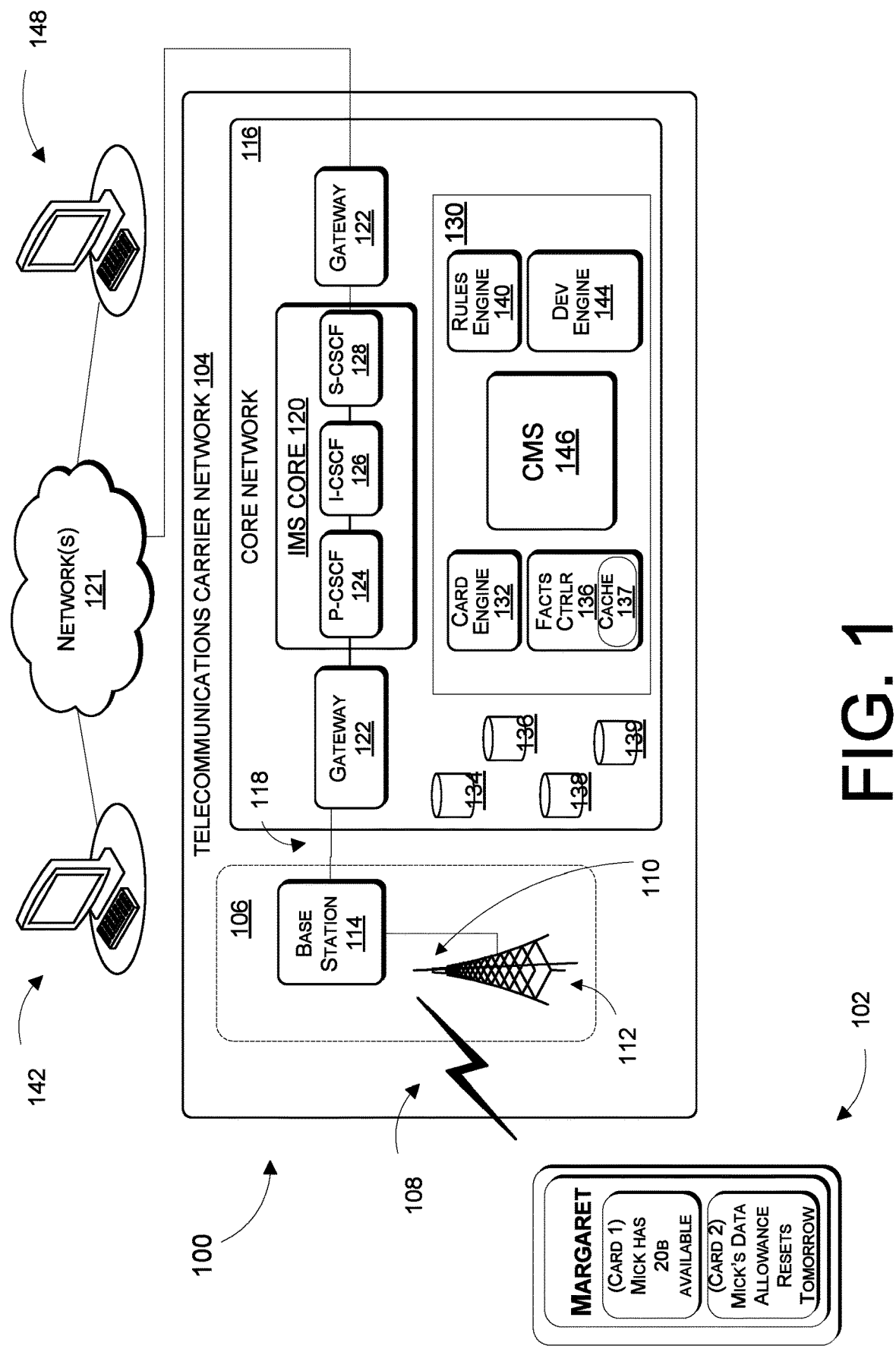
FIG. 1 illustrates an example network architecture to implement a content management system.

In general: "client" as used in this description may refer to a software program that requests information from the card engine; "consumer" may refer to one that receives content or services offered by a network or content provider; "customer" may refer to one having ownership responsibility of user equipment and its account, and/or access to services provided in accordance with a subscription or for other consideration; and "user" may refer to any who uses user equipment. In some instances, "consumer", "customer", and/or "user" may be used interchangeably herein without detracting from the clarity or scope of the description.

In one or more embodiments, techniques are provided to dynamically configure and propagate content and content changes for display via a user interface associated with user equipment (UE). In one or more embodiments, information may be received, stored, and/or interfaced by a facts controller, which may provide the facts to a card engine and/or a rules engine. Specifically, the facts controller provides a data access layer to different data stores and data streams that the card engine may access substantively in real time. In this context, a development engine may enable a developer to customize the user experience using an intuitive developer interface, the card engine may make content decisions according to thematic groupings or collections, and a content management system (CMS) may manage the content with on-the-fly changes to the content and/or related metadata to effect dynamic rule setting, rule enforcement, and presentation by the card engine. From creation to publishing, content may be managed so that content and changes to content may be tested, versioned, and propagated, across multiple channels, substantially in real time.

The card engine manages the notion of cards. Cards may contain, for example, content including data, and functionality, usually in the form of component applications, that presents the data to a user (aka "surfacing") in various formats. "Component applications" may include, by way of example and without limitation, buttons, calls-to-action, widgets, etc. The selection of data to surface and in what format to display the selected data is based on logic associated with each card per a rules engine.

A rules engine may provide constructs to the card engine in the form of card definitions describing both data and functionality of a card, which the card engine may evaluate using facts obtained from the facts controller. The resulting cards may be formatted for display via the user interface and transmitted to the UE accordingly.

While cards relate to the presentation of data, data itself may be organized into groups that relate data by theme or concept. Groups of data provide an intermediate organizing element, e.g., with the use of relational metadata, that maps data from different sources per the facts controller to one or more cards. Because cards may contain a plurality of functions in component applications, the groups may organize a mapping of data from the different sources not just to a single application, but to a set of related component applications or functions. These mappings are stored in objects called "containers." Containers are described in further detail in following sections.

In some embodiments, the card engine may create a hierarchy of containers, which are logical abstracts for containing cards. The containers in the hierarchy, which may be conceptually organized as a tree, may contain card definitions according to respective themes or concepts as determined by the card engine. The card definitions may be evaluated with facts obtained from the facts controller. Cards may have weights which can be changed dynamically based on factors such as, and without limitation, user behavior, account condition, promotions, or offerings. In some embodiments, the card having the highest weight within its container is advanced up the tree. When a card reaches the top level of the tree, it may be surfaced and transmitted to the UE in accordance with rules applied by the rules engine.

A development engine may provide for authoring and developing content blocks (including but not limited to groups, cards, and formatters), managing group and card definitions in accordance with facts (e.g., obtained from the facts controller and rules (e.g., obtained from the rules engine)), and deploying cards for test. In some embodiments, the development engine may be used to dynamically edit groups and card behavior to take advantage of changes in user behavior data and change user experiences accordingly. Further, the development engine may be used to deploy cards to test, collect metrics, and provide data useful for various reports, including but not limited to reports useful at each stage of workflow and to meet financial reporting requirements.

A CMS may implement content management in terms of stages of a content pipeline (e.g., stages of processing content) such as scheduling, reviewing, editing, testing, and reporting. To this and other ends, the CMS may manage one or more operations including, but not limited to, configuring content for publication in a planned format or template(s), and identifying users and their roles, defining workflow tasks, implementing standards and rules, tracking and managing versions of content, configuring and storing the content to a repository, and facilitating retrieval of the content according to established rules. The role of a content management system may be to provide the capability for multiple users with different permission levels to manage content for a website or a section of the content.

FIG. 1 illustrates an example network architecture 100 to implement a card engine. The network architecture 100 may include a UE 102 and a telecommunications carrier network 104. The UE 102 may be a smartphone, a smartwatch, a tablet computer, a phablet computer, or any other computing device that is capable of communicating with other devices via the telecommunications carrier network 104. In one or more embodiments, the telecommunications carrier network 104 may be a cellular network, and may provide telecommunication and data communication in accordance with one or more technical standards, such as 2G/2.5G technologies such as Enhanced Data Rates for GSM Evolution (EDGE), 3G technologies such as Wideband Code Division Multiple Access (W-CDMA) and CDMA-2000 (Code Division Multiple Access 2000), 4G technologies such as High Speed Packet Access (HSPA) and Long Term Evolution (LTE), and 5th Generation (5G) wireless systems such as 5G NR, and/or so forth.

The UE 102 may first access the telecommunications carrier network 104 through a radio access network 106 via a wireless connection 108. The wireless connection 108 may include cellular division multiple access (CDMA), time division multiple access (TDMA), frequency division multiple access (FDMA) and future iterations of cellular division, time division and frequency division wireless communications techniques. Examples include orthogonal frequency division multiple access techniques used in current versions of the wireless connection 108.

In some embodiments, the network side of the wireless connection 108 may terminate with one or more antennas 110 on, e.g., respective cell towers 112 in the case of a cellular network. The antennas 110 may feed to one or more base stations 114, which then may access a core network 116 over a wired connection 118 known as a backhaul. The backhaul 118 is often comprised of fiber optic communications cables, although no limitation should be inferred. A portion of the telecommunications carrier network 104 that includes the antenna(s) 110, cell tower(s) 112, and base station(s) 114 may transfer signals from the UE 102 to the core network 116, i.e. providing access to the core network. Therefore, this portion of the telecommunications carrier network 104 is sometimes called the access network.

In 4G and later embodiments, the core network 116 may include an IP Multimedia Subsystem (IMS) core 120. The IMS core 120 may be accessed via one or more gateways 122 and related components that are tasked with providing connectivity between the telecommunications carrier network 104 and UEs, including the UE 102, by acting as a point of entry and exit for data traffic. In turn, the IMS core 120 may provide the UEs with data access to external packet data networks 121, such as the networks of other telecommunications carrier networks or the Internet.

The IMS core 120 may include a Proxy Call Session Control Function (P-CSCF) 124 or an equivalent function. The P-CSCF 124 may route incoming Session Initiation Protocol (SIP) messages to an IMS registrar server. The P-CSCF 124 may also safeguard the security of the IMS core 120 by handling Internet Protocol Security (IPSec) for communications that are exchanged with user devices. In some alternative instances, instead of SIP sessions, the P-CSCF 124 may handle Remote Authentication Dial-In User Service (RADIUS) sessions. The P-CSCF 124 may interact with an Interrogating CSCF (I-CSCF) 126 and a Serving CSCF (S-CSCF) 128. In some instances, the I-CSCF 126 may be an inbound SIP proxy server of the IMS core 120. During IMS registration of a UE, the I-CSCF 126 may query a home subscriber server (HSS) to designate an S-CSCF 128 to service the UE 102. The I-CSCF 126 may be further responsible for routing incoming IMS session requests and terminating IMS sessions requests.

The core network 116 is the portion of the telecommunications carrier network 104 where routing, billing, policy implementation and other communications services may be implemented by, for example, a Policy and Charging Rules Function (PCRF) or another equivalent rules engine and/or billing function. For example, a billing function may enable the telecommunications carrier network 104 to monitor services, such as data, voice, text, etc., that are used by subscribers of the telecommunications carrier network 104 and charge the subscribers and/or other parties in real-time based on service usage. In various embodiments, the billing function may be an Online Charging System (OCS) or another equivalent core network component of the telecommunications carrier network 104.

The core network 116 may include one or more application servers, including without limitation an enterprise information technology (EIT) server 130, to implement application servers and host a card engine 132 coupled to a card data storage 134, a facts controller 136 coupled to a facts storage 138, a rules engine 140, a development engine 144, and a CMS 146. In one or more embodiments, the card engine 132, rules engine 140, development engine 144, and/or CMS 146 may also be coupled to the facts storage 138. A developer may access the development engine 144 using a developer's computing device 142. A content manager may access the CMS 146 using a content manager's computing device 148.

The card engine 132 may collect data from the facts controller 136 into conceptual or thematic groups, receive containers and card definitions from the rules engine 140, and evaluate the card definitions to produce content for cards that may be presented to a user via a user interface of the UE 102.

The facts controller 136 may gather and store facts associated with every experience or user engagement on the UE 102 and through the telecommunications carrier network 104. For example, the facts controller 136 may collect, from other systems, for example from cards or other user telemetry sensors, user behaviors, usage data, and system information for use by the card engine 132 and the rules engine 140 in determining what cards to surface and when. In this sense, the facts controller 136 offers a "shared fact service" for the benefit of the card engine 132, the rules engine 140, and other engines and purposes consistent with its function.

Facts gathered by the facts controller 136 may include unique facts (e.g., customer-specific facts such as, and without limitation, current data plan usage, customer identifier, and/or device type) or non-unique facts (e.g., customer-nonspecific facts such as, and without limitation, events such as adding a new line, ordering a new cellphone, or exceeding a usage threshold). Both types of data may be used by the card engine 132 to evaluate cards or by the rules engine 140 to direct communications such as alerts, actionable messaging, and/or dashboards to, e.g., a customer, a care representative, or a sales representative.

Facts may be "parent" facts that include subfacts relating to the parent fact (e.g., relating to the value of the parent fact in a name-value pair) and inherit metadata of the parent fact (which may be a minimum set of data). Facts and subfacts may be provided at the same time, to the facts controller 136 or by the facts controller 136 in response to a request. In some examples, the facts controller 136 may be configured to gather fact metadata from sources such as various enterprise servers and trusted third party servers.

The facts controller 136 may cache facts in a facts cache 137 in accordance with a caching policy e.g., to improve computational efficiency of the card engine 132 and the rules engine 140. Cached facts further ensure that these and other engines (e.g., a workflow engine) may provide a common experience based on a common fact schema, discussed below.

While facts may be cached to improve computational efficiency, blacklisting and whitelisting relating to fact data may ensure an accuracy of underlying cached facts. Whitelists and blacklists may be defined, for example, by a service representative, a consumer, or an administrator of the telecommunications service provider. Alternatively or in addition, the cache may be bypassed if set in the request.

The facts controller 136 may decouple or delete fact data in the cache 137 based on an expiration date associated with a fact or subfact. Facts may have a minimum set of data: primary key (i.e. device identifier), key, value, type (unique or non-unique), timestamp, expiration, sensitivity (i.e. whether access to the fact is unrestricted, restricted, confidential), and source. In some embodiments, the device identifier may correspond to an aggregated user identifier managed by a communications carrier, such as T-Mobile ID™. Specifically, a communications carrier may manage identifier requests by mapping one or more devices, cellular or WIFI or otherwise to a user identifier specific to the carrier, in a supplementary table communicative with a Home Location Register or a Home Subscriber Service, or other carrier user database.

Commonly, non-unique facts have an expiration date, and once the expiration date has passed, the fact may decouple. Further since subfacts inherit the metadata associated with a parent fact, an expiration of the parent fact can cause the related subfacts to decouple. Facts may also be decoupled based on a change in sensitivity. For example, the rules engine 140 may dictate the sensitivity of facts that may be stored by the facts controller 136. If the sensitivity of a stored fact changes, the fact may be decoupled.

The facts controller 136 may hold previously stored (deposited) facts and facts that have been cached during an application programming interface (API) gather call. To ensure accuracy of facts, deposited facts have a higher precedence. Thus, the facts controller 136 may decouple cached facts that are associated with a gather call in response to receiving a similar deposited fact.

In one example, the card engine 132 may request a fact associated with the consumer. For the sake of efficiency, if response times to gather the facts exceed a threshold, the facts controller 136 may deliver known facts until that point. If the requested fact is not a known fact, the card engine 132 may omit the card from presentation to the consumer.

In some embodiments, some or all facts may be offered by the client in the request to specify return of cards that contain such facts. In instances in which fewer than all facts are included in the request (a "partial facts" request), the card engine 132 should still gather facts to complete the response. In instances in which all facts are included in the request (a "complete facts" request), the card engine 132 should not gather additional facts when evaluating the request.

The rules engine 140 may determine what cards to surface, to which UE 102, and when based on predetermined rules and/or dynamically generated rules. The rules engine 140 may develop and deploy business logic used by the card engine 132 to evaluate a container, for example. The rules engine 140 may use machine learning algorithms and facts data (e.g., facts and/or data about facts) obtained from the facts controller 136 to dynamically configure a presentation style of cards based on known user preferences and other factors.

The development engine 144 may provide access by a developer to the card engine 132, facts controller 136, and rules engine 140. A developer may be able to access the development engine 144 via a developer tool resident on the developer's computing device 142. Access to the card engine 132, facts controller 136, and rules engine 140 may enable the developer to add, delete, or modify rules or details of cards and containers that impact the generation of rules enforced by the rules engine 140.

The developer's computing device 142 may be a general purpose computer such as a desktop computer, tablet computer, laptop computer, server, and so forth. However, in some embodiments, the developer's computing device 142 may be a smartphone, game console, or other electronic device that is capable of receiving inputs, processing the inputs, and generating output data in accordance with one or more embodiments described herein.

The CMS 146 may enable a content manager to organize or control the setting of rules, policies, and access permissions of content for enforcement by the rules engine 140, including organizing, searching, version tracking and access control. Content management may have many aspects between creation (content origination) and publishing (content presentation). That is, content may be created by webpage designers, authors, musicians, etc. and published by, e.g., a web server; content management concerns, among others, the operations that take the created content and prepare it for publication. Therefore, the CMS 146 may be involved with one or more of reviewing and editing content, version control to track changed content and create rollback points in the event of a crash or incorrect presentation, and testing, to name a few aspects.

The content manager's computing device 148 may also be a general purpose computer or other electronic device that is capable of receiving inputs, processing the inputs, and generating output data.

Figure 2:
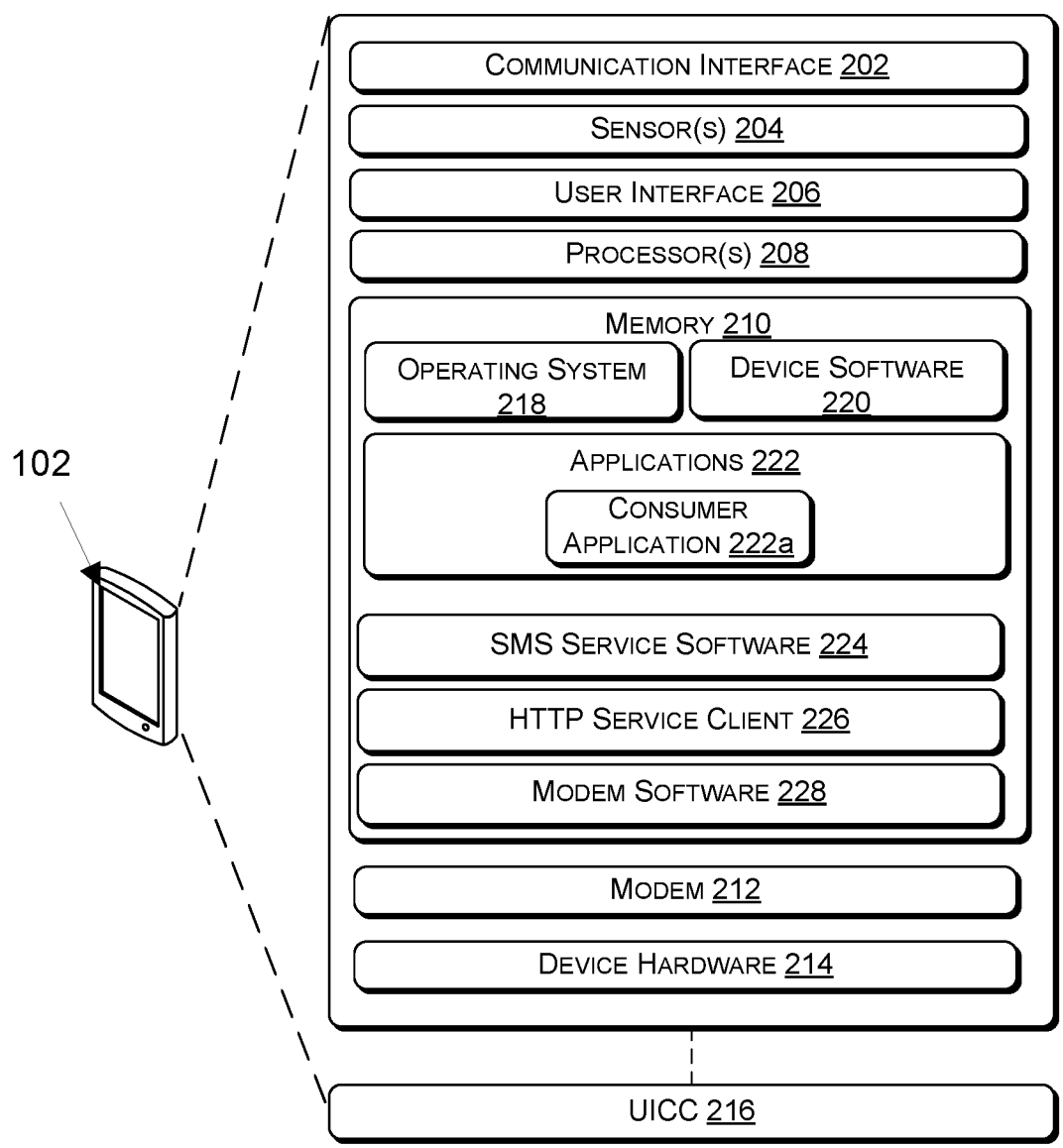
FIG. 2 is a block diagram showing various components of an illustrative user equipment.

FIG. 2 is a block diagram showing various components of an illustrative UE 102. The UE 102 may include a communication interface 202, one or more sensors 204, a user interface 206, one or more processors 208, and memory 210. The communication interface 202 may include wireless and/or wired communication components that enable the electronic device to transmit or receive voice or data communication via the radio access network 106, as well as other telecommunication and/or data communication networks. The sensors 204 may include a proximity sensor, a compass, an accelerometer, an altimeter, and/or a global positioning system (GPS) sensor. The proximity sensor may detect movement of objects that are proximate the UE 102. The compass, the accelerometer, and the GPS sensor may detect orientation, movement, and geolocation of the UE 102.

The user interface 206 may enable a user to provide input and receive output from the UE 102, including for example providing one or more input to initiate device activation. The user interface 206 may include a data output device (e.g., visual display, audio speakers), and one or more data input devices. The data input devices may include, but are not limited to, combinations of one or more of touch screens, physical buttons, cameras, fingerprint readers, keypads, keyboards, mouse devices, microphones, speech recognition packages, and any other suitable devices or other electronic/software selection methods.

The memory 210 may be implemented using computer-readable media, such as computer storage media. Computer-readable media include, at least, two types of computer-readable media, namely computer storage media and communications media. Computer storage media include volatile and non-volatile, removable and non-removable media implemented in any method or technology for storage of information such as computer-readable instructions, data structures, program modules, or other data. Computer storage media include, but are not limited to, RAM, ROM, EEPROM, flash memory or other memory technology, digital optical disks including CD-ROM, Digital Versatile Disk (DVD), Blu-Ray or other optical storage, magnetic cassettes, magnetic tape, magnetic disk storage or other magnetic storage devices, or any other non-transmission medium that can be used to store information for access by a computing device. Computer storage media in the context does not consist of transitory modulated data signals In contrast, communication media may embody computer-readable instructions, data structures, program modules, or other data in a modulated data signal, such as a carrier wave, or other transmission mechanism.

The UE 102 may also include a modem 212 and other device hardware 214. The modem 212 is a hardware component that enables the UE 102 to perform telecommunication and data communication with the radio access network 106. The device hardware 214 may include other hardware that is typically located in a mobile telecommunication device. For example, the device hardware 214 may include signal converters, antennas, hardware decoders and encoders, graphic processors, a Universal Integrated Circuit Card (UICC) slot (e.g., SIM slot), and/or the like that enables the UE 102 to execute applications and provide telecommunication and data communication functions. The UICC 216 may be an integrated circuit chip that is inserted into the UICC slot of the UE 102, or an embedded UICC (eUICC) that is hardwired into the circuit board of the UE 102.

The one or more processors 208 and the memory 210 of the UE 102 may implement an operating system 218, device software 220, one or more applications 222 (including an application 222a), SMS service software 224, a HTTP service client 226, and modem software 228. The one or more applications 222 may include a consumer application 222a. The various software and applications may include routines, program instructions, objects, and/or data structures that perform particular tasks or implement particular abstract data types. The operating system 218 may include components that enable the UE 102 to receive and transmit data via various interfaces (e.g., user controls, communication interface 202, and/or memory input/output devices). The operating system 218 may also process data using the one or more processors 208 to generate outputs based on inputs that are received via the user interface 206. For example, the operating system 218 may provide an execution environment, such as a Java Virtual Machine or Microsoft's Common Language Runtime™, for the execution of the applications 222. The operating system 218 may include a presentation component that presents the output (e.g., displays the data on an electronic display, stores the data in memory, transmits the data to another electronic device, etc.).

The operating system 218 may include an interface layer that enables applications to interface with the modem 212 and/or the communication interface 202. The interface layer may comprise public APIs, private APIs, or a combination of both public APIs and private APIs. Additionally, the operating system 218 may include other components that perform various other functions generally associated with an operating system. The device software 220 may include software components that enable the UE 102 to perform functions. For example, the device software 220 may include basic input/output system (BIOS), Boot ROM, or a bootloader that boots up the UE 102 and executes the operating system 218 following power up of the device.

The applications 222 may include applications that provide utility, entertainment, and/or productivity functionalities to a user of the UE 102. For example, the applications 222 may include telephony applications, electronic mail applications, remote desktop applications, web browser applications, navigation applications, office productivity applications, multimedia streaming applications, and/or so forth.

The SMS service software 224 may provide the UE 102 with the ability to send and receive SMS messages from a Short Message Service Center (SMSC), such as an SMS server that resides on the radio access network 106. In various embodiments, the transmission of messages between the SMSC and the SMS service software 224 may be performed according to the Mobile Application Part (MAP) of the Signaling System 7 (SS7) protocol, or alternatively via an application layer on top of a TCP/IP stack. The size of the SMS messages may be constrained by the protocol to 140 octets or 1120 bits. The SMS messages may be encoded using a variety of alphabets, such as the GSM 7-bit alphabet, the 8-bit data alphabet, the 16-bit UCS-2 alphabet, and/or so forth. In some embodiments, the SMS messages that are passed between the SMS service software 224 and the SMSC may be encrypted and decrypted by both parties according to the SCP80 OTA secure channel protocol, or another equivalent secure SMS communication protocol.

The HTTP service client 226 may enable the UE 102 to establish a communication session with a server, such as a web server or a file service, using HTTP. HTTP is an application layer protocol that uses an underlying transport layer protocol, such as the Transmission Control Protocol (TCP), the User Datagram Protocol (UDP) and/or so forth. HTTP is a request-response protocol, in which the HTTP service client 226 may submit an HTTP request message, and the server may respond with a requested resource in a response message to the HTTP service client. In some embodiments, the HTTP service client may also use the HTTP Secure (HTTPS) protocol to communicate with a server, in which the communication session is encrypted by a security protocol such as, the Transport Layer Security (TLS) protocol.

The modem software 228 may drive the modem 212 to perform telecommunication and data communication with the radio access network 106. The modem software 228 may be firmware that is stored in dedicated non-volatile memory of the UE 102. Such non-volatile memory may include read-only memory (ROM), erasable programmable read-only memory (EPROM), or flash memory.

Figure 3:
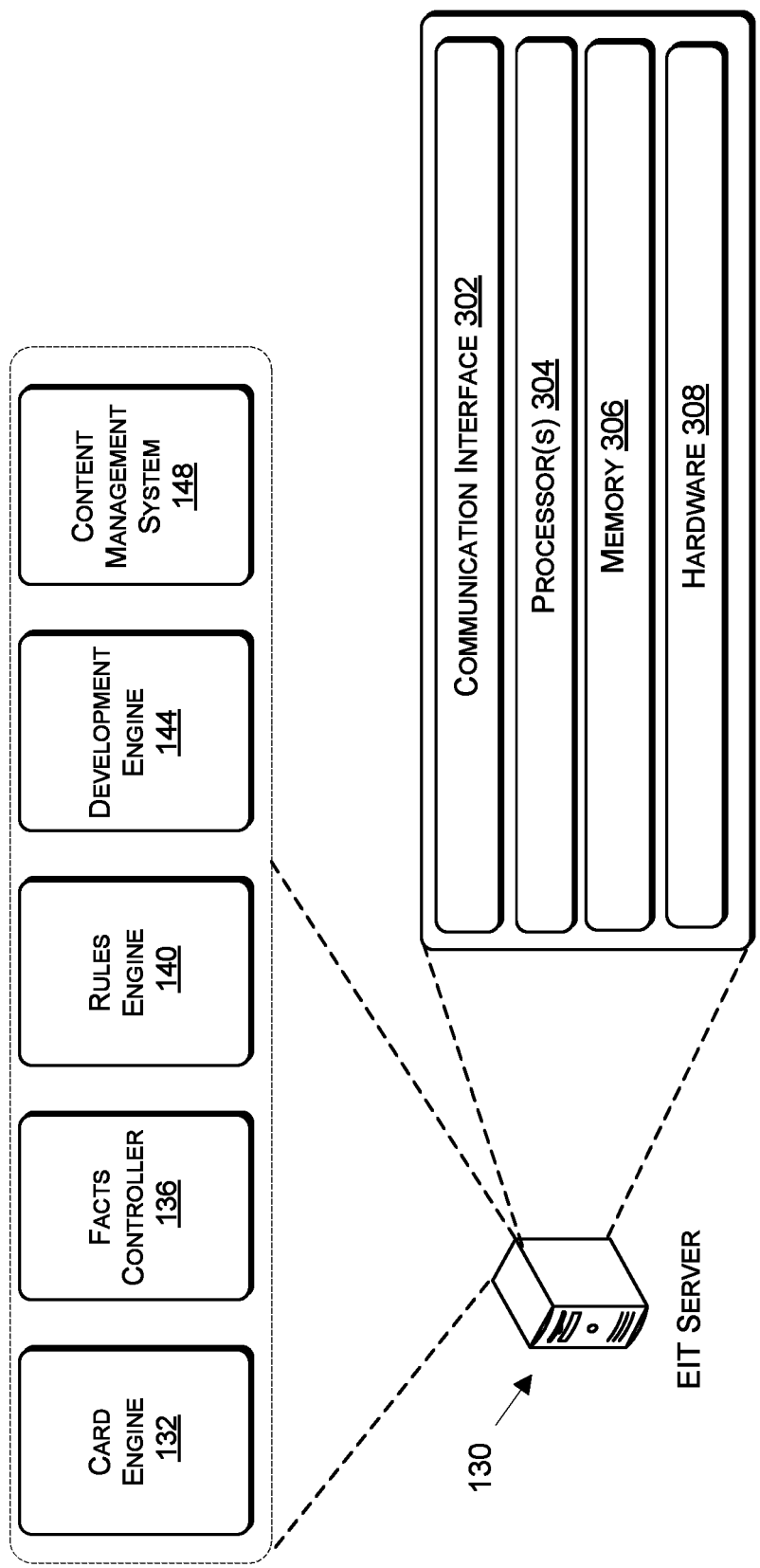
FIG. 3 is a block diagram showing an example of various components of an EIT server that support the core network for implementing a card engine, a facts controller, a rules engine, a development engine, and a content management system.

FIG. 3 is a block diagram showing an example of various components of the EIT server 130 that supports the core network 116 for implementing the card engine 132, the facts controller 136, the rules engine 140, the development engine 144, and the CMS 146. The EIT server 130 is in many respects analogous to the UE 102 and thus may include a communication interface 302, one or more processors 304, memory 306, and hardware 308. The communication interface 302 may include wireless and/or wired communication components that enable the EIT server 130 to transmit data to and receive data from other networked devices such as the card data storage 134, the facts storage 138, and the external storage 139. The one or more processors 304 may control various functions of the EIT server 130 and implement an operating system, the card engine 132, the facts controller 136, the rules engine 140, the development engine 144, and the CMS 146. The memory 306 may store the operating system and applications comprised of software components. The hardware 308 may include additional user interface, data communication, or data storage hardware.

The card engine 132 may generate a hierarchy of containers in the form of a tree in one or more embodiments. A container may contain one or more cards and/or one or more other containers.

A card results from evaluating (resolving) a card definition. A user, via the user interface 206, may cause the UE 102 to send a card request by, for example and without limitation, the user logging into his or her account with a telecommunication service provider, clicking on a button or call to action (CTA) on the user interface 206, or performing some other action using the UE 102. In response, the UE 102 may send a request to the card engine 132 for cards corresponding to the user input. In response to the request, the card engine 132 may evaluate one or more card definitions to create and send cards to fulfill the request. "Evaluation" may be considered a process by which the UE 102 requests cards from the card engine 132, which formats the card with facts obtained from the facts controller. Thus, a card is a representation of data that is formatted into content which is then presented per the user interface items and logic of the card (a "surfacing") via the application 222a and user interface 206 and thus "ready for consumption" via the UE 102.

Card definitions may be generated by the rules engine 140 using unique facts and non-unique facts that may be obtained from the facts controller 136. The number of facts available to the various engines and developers is not limited and may include placement and visibility on the user interface 206, marketing content (e.g., headlines, greetings, descriptions), imagery (static and dynamic), facts about the customer (including facts about the customer plan or device), offer details, calls to action (CTAs), time of day, device location, eligibility for an offer or promotion, (based on, e.g., time/date windows, device and operating system eligibility, plan type, customer account information, and/or account status), channel, and language. Some facts may be stored in a dictionary maintained by the facts controller 136.

A card definition may have multiple components resolved by the card engine 132 including, without limitation, one or more variants, conditional statements, and/or metadata related to facts. A variant may be keyed to a card identifier so as to be entered when the card definition is evaluated. In the surfaced card, the variant may represent a dynamic variable and characteristic of the user experience brought by the card when presented. One card may have multiple variants. A card also may have zero variants, but such a card will not be returned in response to a card request.

Variants may capture unique facts associated with a user in general to be presented via a card (e.g., customer name, device type, data allowance, remaining data allocation, etc.) and/or non-unique facts associated with the user at a given point in time (i.e. time of day, day of the week, location, etc.), and be dependent on a trigger condition that determines whether the variant can be returned. In some embodiments, a variant may contain content based on geolocation (e.g., current location of the user). A variant also may be linked to one or more CTAs. The rules engine 140 may analyze variants of cards and assign weight values that affect or control whether a card is presented to a consumer in some embodiments described herein.

Conditional statements may determine whether a card or container can be returned. Conditional statements are intended in general to contain logic which evaluates to determine a card's validity for surfacing. For example, and without limitation, an appropriately written conditional statement may prevent a card from surfacing if the user is current on her account and has an iOS device. As another example, a conditional statement may permit the presentation of a promo card only for a specified period.

Fact metadata may include one or more of a primary key (i.e. device identifier), key, value, type (unique (e.g., fact) or non-unique (e.g., event)), timestamp, expiration, sensitivity (i.e. unrestricted, restricted, confidential), and source. In some embodiments, a minimum set of metadata, such as primary key, key, value, type, timestamp, and source may be sufficient. In addition to its role in gathering and retrieving facts, this information may be used by the facts controller 136 to decide whether to cache a fact and for how long, or to optimize the gathering of facts by selecting services to call, thus reducing latency and load on downstream services.

Cards may have subcards that individually relate to a higher-level card of the tree. Subcards are essentially cards that belong to other cards, and therefore subcards may be referred to as "cards" herein. There may be one or more subcards that are grouped according to a theme or concept. Examples of subcards groupings may include consumer name and category description of underlying data, such as "promotions" (e.g., a top-level card may be an individual promotional offering). In some embodiments, subcards may access the cache 137 in the facts controller 136 to personalize a card by adding "known" consumer facts (i.e., facts about the consumer or other consumers that have been added previously to the facts controller 136). Subcards definitions can be dynamically updated based on iterated content (e.g., fact data from the facts controller 136 updated in real-time or based on prior customer selections to access or ignore previous cards within the same (or different) container).

Weight values assigned to variants and imputed to cards and/or containers may contribute to determining whether and/or when a card will surface. For example, the card engine 132 may prioritize presentation of a card from a container to a UE 102 based on one or more of weighted values and/or rules such as location, time of day, day of the week, context of operation, or any other standardized or consumer-specific rule.

In some embodiments, the card engine 132 may select the highest weighted card from child container(s) in a parent container for surfacing. A weight value may be based on machine learning (ML) or cognitive network (CN) algorithms that analyze customer selections or based on correlations within a client model of similar consumers.

Variants may have a single weight value—a larger value may indicate higher weight. In some embodiments, weight may be mandatory for a variant. When a card definition is evaluated, the weighted values of the card's variants may change the value of the card itself. Evaluated cards from the bottom of the tree rotate up toward the top of the tree, in order of their weights in some embodiments. The evaluated cards may be surfaced from the top of the tree.

In accordance with the card engine 132 assessing the cards and variants for presentation in response to a request for cards, the card engine 132 may assess variants for possible cards in the order in which they are listed within the card, selecting the first variant that is possible to display. Once a variant has been selected, the card may acquire the weight of the variant. To select one card from a group, the card engine 132 may choose the highest weighted of the available cards to surface from its container before a card in the same container having a lower weight.

Containers optionally may be configured for the card engine 132 to sort the cards under them by weight. The response to a request for a group of cards may be in the final order of cards with no subsequent sorting. In this way, other systems as needed can replicate what has been presented.

Some containers (e.g., carousel containers) may not be made transparent to the client, but their cards may still have weight values. In this sense, one may refer to the container as having weight. Weight may be mandatory for such containers. Consider, for example, a carousel container that has a parent container whose content is sorted. An example is discussed below with respect to FIG. 10. In this example, the carousel container is a container that holds multiple cards and has its own markup to inform the client how the cards should be rendered. The placement of the carousel container may be based on its own weight. Nevertheless, the content of the carousel container may be sorted (or not) based on whether the carousel container is configured to be sorted in the evaluation process and on the weights of the selected variants within it.

The card engine 132 may request a fact associated with the consumer from the facts controller 136. Typically the facts controller will check the cache 137 for presence of the requested facts before searching the facts storage 138 or another source 139 from which to gather the facts. For the sake of efficiency, if response times to gather the requested facts exceed a threshold, the facts controller 136 may deliver known facts until that point. If a requested fact is not a known fact, the card engine 132 may omit the card from surfacing. If a card or subcard is missing an array fact (discussed below) at the time that that card or subcard is to be presented, then that card or subcard is skipped and not presented.

Containers offer a new way of querying and serving content to the application 222a in the form of cards. For example, the logical grouping and content collection by the card engine 132 uses the concept of containers in the selection of cards to be surfaced for greater flexibility in the user experience and better serve mobile users.

There are different types of containers that are generated to hold cards of different conceptual or thematic groups. Examples of containers may include, but are not limited to, array containers, tag containers, carousel/list containers, basic containers, named group containers, recipe containers, A/B containers, and type containers. Different types of containers may have different effects when resolved.

Containers may be created by evaluating container definitions that may be generated by the rules engine 140. A container definition may be considered as an abstraction that represents a logical grouping of cards, from which one or more cards are advanced to be selected for surfacing in accordance with embodiments described herein. The logical grouping of cards may be content-based or based on the type of container. For example, a container definition may include a top-level card ("furniture card") that identifies a grouping of subcards. In some embodiments, the grouping may be performed by the card engine 132 by tag, type, etc. Card definitions resolve to cards and subcards resolve to subcards when evaluated by the card engine 132. Similarly, a container definition resolves to a container, which may occur at card evaluation.

The container hierarchy tree may be evaluated iteratively, with a container passing up to its parent zero or more cards that occur during its resolution. The evaluated cards passed up from the root of the tree may be surfaced from the top of the tree for display via the user interface 206.

Figure 4:
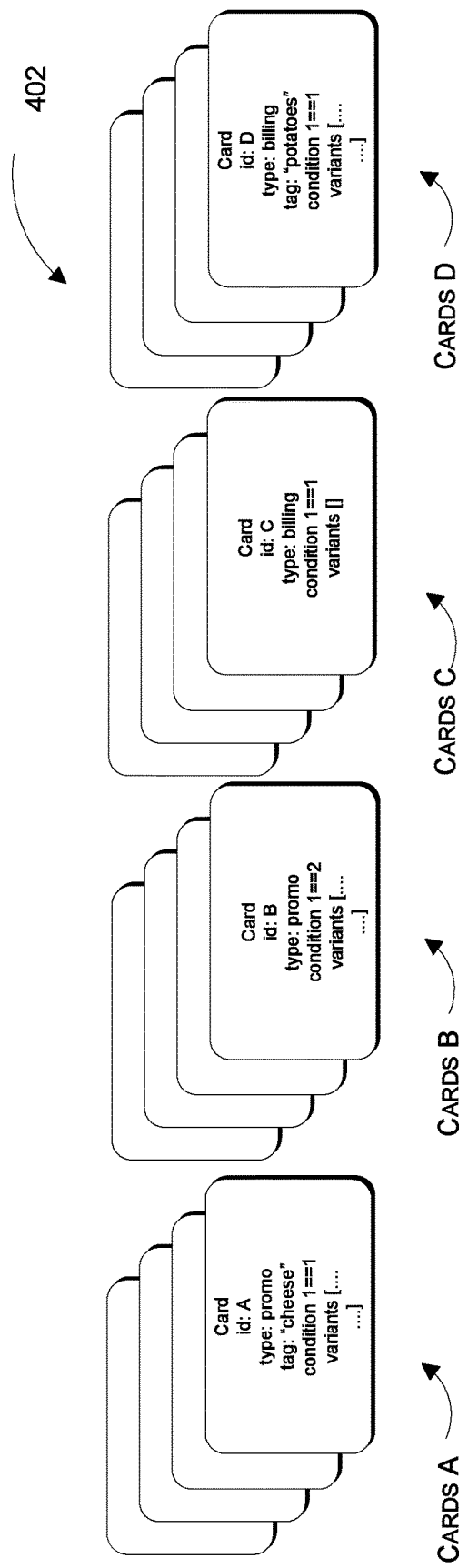
FIG. 4 illustrates exemplary cards that are grouped according to a theme or concept.

FIG. 4 illustrates exemplary cards 402 that are grouped according to a theme or concept. The cards 402 may include cards A (identified by id: A), cards B (identified by id: B), cards C (identified by id: C), and cards D (identified by id: D). Cards A have a tag "cheese" so as to be collected in response to a search for "cheese;" a true/false condition of "true" (1==1) (relative, e.g., to an A/B test), and variants that may differ from card to card. Cards B are promo cards (type: promo) that may show a promotion when surfaced and have a true/false condition of "false" (1==2) and variants. Cards C are billing cards and have a true/false condition of "true" but no variants. Cards D are also billing cards and have a tag "potatoes," a true/false condition of "true," and variants.

Figure 5:
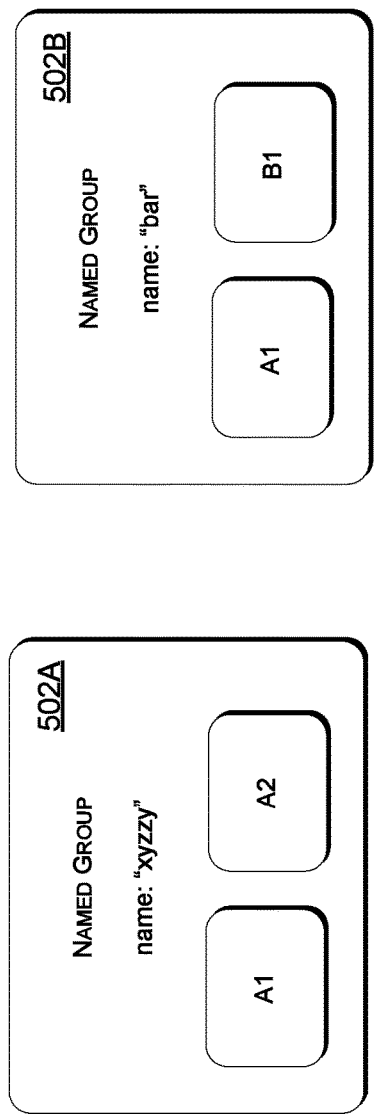
FIG. 5 illustrates examples of named group containers.

FIG. 5 illustrates examples of containers 502A and 502B. The container 502A is a named group container with the name "xyzzy" and contains the cards A1 and A2 (i.e., two of the cards A). The container 502B is a named group container with the name "bar" and contains the card A1 and the card B1 (i.e., one of the cards A and one of the cards B, respectively).

Referring to the example shown in FIG. 4 and FIG. 5, Cards A and Cards D are always available for surfacing (based, for example, on condition 1==1 and the presence of variants). Cards B are never available for surfacing as their conditions are always false (1==2), and Cards C are never available for surfacing as there are no variants for Cards C.

Figure 6:
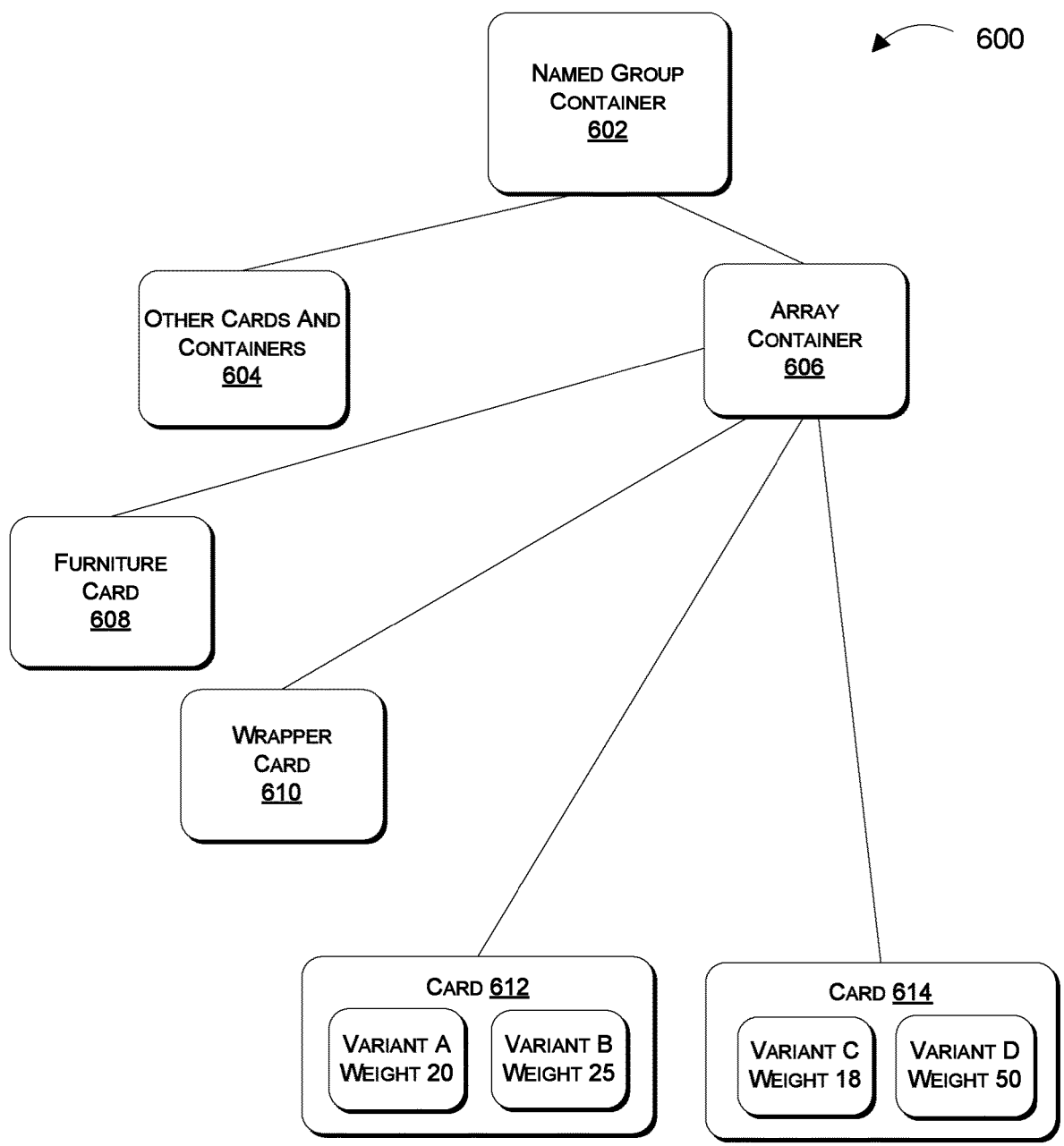
FIG. 6 illustrates an example of a container tree, which represents a container hierarchy created by the card engine.

FIG. 6 illustrates an example of a container tree 600, which represents a container hierarchy created by the card engine 132. The container tree 600 includes a top-level named group container 602 and, one level below the container 602, other cards and containers 604 and an array container 606.

An array container may permit an author to tailor content to be displayed in a particular way for individual clients and can be configured using various fields with which instances are created. Some examples include, but are not limited to:

array_fact—A string representing the name of an array fact. If an array fact is not present at card evaluation time, the evaluation of the array container is skipped.

furniture_card—The card definition that represents the top-level card returned when the array container is resolved.

wrapper_card—A card definition that represents a second-level card returned when the array container is resolved.

cards (subcards)—An ordered collection of card definitions that will be evaluated once per iteration of the given array_fact. The resulting cards from this evaluation may be added as subcards to that iteration's wrapper card.

max_iterations—An integer that represents the maximum number of wrapper cards that will be returned nested inside the furniture card when the array container resolves.

max_cards_per_iteration—An integer that represents the maximum number of subcards that any wrapper card can contain.

pre_sort—A boolean value (flag) that controls the order of subcards within a wrapper card. If true, the weight of each card will determine the order within the respective wrapper card (i.e., the subcards are sorted with the wrapper card). If false, the order in which the subcards exist in the container definition will determine their order. In some embodiments, this can promote uniformity in ordering between wrapper cards, instead of allowing the variant's weight to decide the order.

An array container may also contain other containers.

As shown in FIG. 6, the array container 606 may include a furniture card 608, a wrapper card 610, and cards 612 and 614. In some embodiments, the cards 612 and 614 may be evaluated and added to the wrapper card 610. The furniture card 608 may represent the top-level card returned when the array container 606 is evaluated. However, if the furniture card 608 does not evaluate, then no cards are returned. The furniture card 608 may be designed to group the entire result of the evaluation of array container 606, such that the furniture card 608 can surface (be displayed) alongside other cards on the user interface 206. The furniture 608 card may also be used to provide other data or features, such as a title, summary, CTAs, etc. for all content that could add context to iterable content in later-surfaced cards (e.g., a customer greeting and promo announcement).

The wrapper card 610 may represent a second-level card returned when the array container 606 is resolved. In some embodiments, the wrapper card 610 may represent the results of a single iteration over a given array fact. Although only one wrapper card is discussed herein, there may be more than one wrapper card, the number corresponding to the number of iterations. The wrapper card 610 may be designed to group a collection of cards that may evaluate from an iteration. For example, whilst iterating through a collection of cards related to one or more promotions, it may be desirable to return several cards relating to a single promotion. The wrapper card 610 could contain that promotion's name, a customer's name, a CTA, or any styling/branding for that promotion in the displayed card. Evaluated wrapper cards may be nested inside the top-level furniture card 608. However, in some embodiments, if the wrapper card definition does not exist in the cache 137, then no top-level cards are returned.

The furniture card 608 may have no access to array facts. Authors can continue to use customary and inherent facts, e.g., the user's name and residence, time of day, etc. However, the wrapper card 610 and subcards such as cards 612 and 614 may have access to customary and inherent facts, as well as access to their iterations' array facts.

In one or more embodiments, an iteration performed over each element of an array fact may include one or more of evaluating a wrapper card 610 (if the wrapper card does not evaluate, the current iteration is skipped), evaluating subcards (if no subcards evaluate into cards, the current iteration is skipped), sorting the evaluated subcards with respect to weight (and pre-sort flag), reducing the number of subcards to meet the max_cards_per_iteration value (if applicable), and adding the subcards into the wrapper card 610. The iterations are stopped if the max_iterations value is reached. Some or all of the wrapper cards may be added to the furniture card 608 and the furniture card 608 may be returned accordingly.

In the example shown in FIG. 6, the card 612 has a variant A with a weight 20 and a variant B with a weight 25. The weight of a variant may influence the presentation of cards and/or the order of presentation of cards to a given UE 102. In one or more embodiments, the sum of the weights of a card's variants may be the weight of the card. For example, the weight of the card 612 may be 45 (i.e., the sum of the weights of the variant A and the variant B) and the weight of the card 614 may be 68 (i.e., the sum of the weights of the variant C and the variant D). When a card definition is evaluated, the weighted values of the card's variants may change the value of the card itself.

FIGS. 7 and 9-11 present illustrative processes for implementing the card engine 132, the facts controller 136, and the rules engine 140. The processes are illustrated respectively as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the network architecture 100 of FIG. 1.

Figure 7:
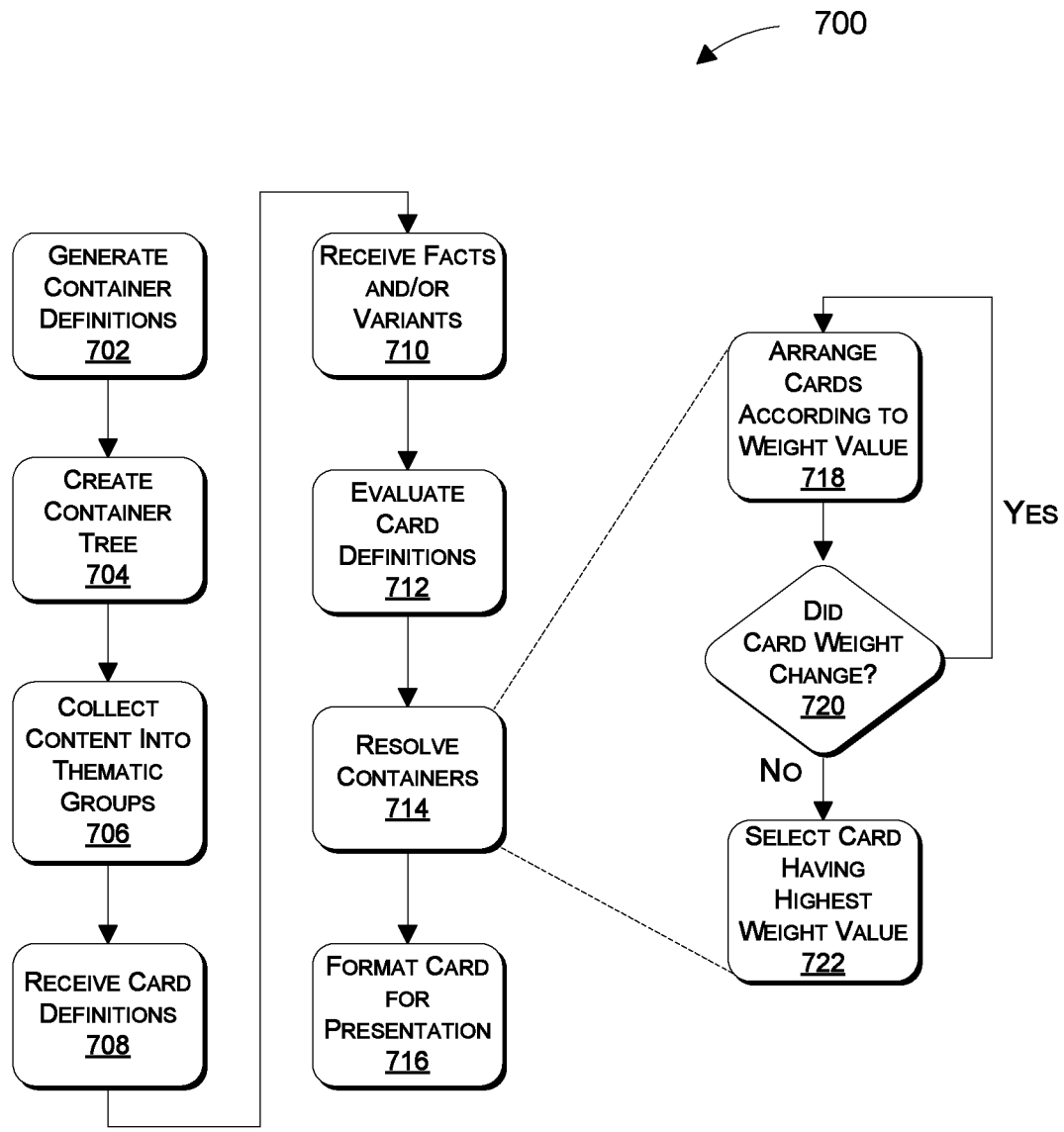
FIG. 7 presents an illustrative process for implementing the card engine.

FIG. 7 is a flow diagram of an example process 700 performed at least in part by the card engine 132 for generating and surfacing one or more cards. At block 702, the card engine 132 may generate container definitions. The container definitions may represent logical groupings of cards according to theme or concept. Container definitions are resolved into containers that may contain zero or more cards in accordance with various embodiments including those described herein.

At block 704, the card engine 132 may create a container hierarchy or tree to organize containers for determining cards to be surfaced. Using the example of FIG. 6, the container tree 600 may contain, for example and without limitation, the named group container 602 at the top of the tree, the other cards and containers 604 below the named group container, and the array container 606. However, other hierarchies may be created, including hierarchies without array containers such as those described herein and other hierarchies consistent with this disclosure. In this regard, reference is made to U.S. patent application Ser. No. 16/389,520, the contents of which are incorporated by reference.

At block 706, the card engine 132 may collect content into thematic groups (e.g., promo, billing to name two possibilities). Examples of content may include but are not limited to greetings, banners, facts (unique and non-unique), product or service offering, or other data related to a consumer's environment or habitual routine (e.g., weather forecast, traffic conditions, etc.).

At block 708, the card engine 132 may receive card definitions, e.g., from the rules engine 140. Card definitions are evaluated into cards in accordance with facts that may be obtained from the facts controller 136. Card definitions may also include conditional statements, which may determine whether a card, or a variant thereof, is presented via the user interface 206 and may be defined by the rules engine 140.

At block 710, the card engine 132 may receive facts and/or variants from the facts controller 136. Facts and variants are used by the card engine 132 to evaluate card definitions.

At block 712, the card engine 132 may evaluate card definitions in accordance with the facts/variants received at block 710 in accordance with various embodiments including those described herein. The result of evaluating card definitions is cards that, as available, may be transmitted to the UE 102 for presentation.

At block 714, the card engine 132 may resolve containers in the container tree. Resolving containers may include rotating evaluated cards up the container tree until surfacing. The cards may rise in the container tree in order of weight (i.e., the card in a container having the highest weight of all cards in the container may rotate up first, followed by the card having the next highest weight, etc.) or otherwise. Block 714 may occur at the same time as block 712.

At block 716, the cards that have reached the top-level container are formatted for transmission to the UE 102 and presentation via the application 222a and the user interface 206.

Block 714 may include blocks 718, 720, and 722 in some embodiments. At block 718, the card engine 132 may arrange the cards according to weight value. As described above, the weight of a card may vary with the weight(s) of its variant(s). Further, the card having the highest weight of all cards in the same container may rotate up to the next-level container first among such cards, followed by the card having the next highest weight, etc.

As described above, card weighting may change in accordance with weight changes in its variants. Any changes in the weight of a card may impact when or even whether the card will surface. At decision block 720, the card engine 132 may determine whether a card's weight has changed (due, e.g., to a change in weight of one or more of its variants). The "determination" may be based on, e.g., receiving a change indication from the rules engine 140. If the card engine 132 determines that a card's weight has changed ("yes" at decision block 720), the process may return to block 718, where the cards in the container will again be arranged according to weight value. If the card engine 132 determines that a card's weight has not changed ("no" at decision block 720), the process may proceed to block 722. At block 722, the card engine selects the card having the highest weight value of all cards in the container, and the process 700 may proceed to block 716.

Figure 8:
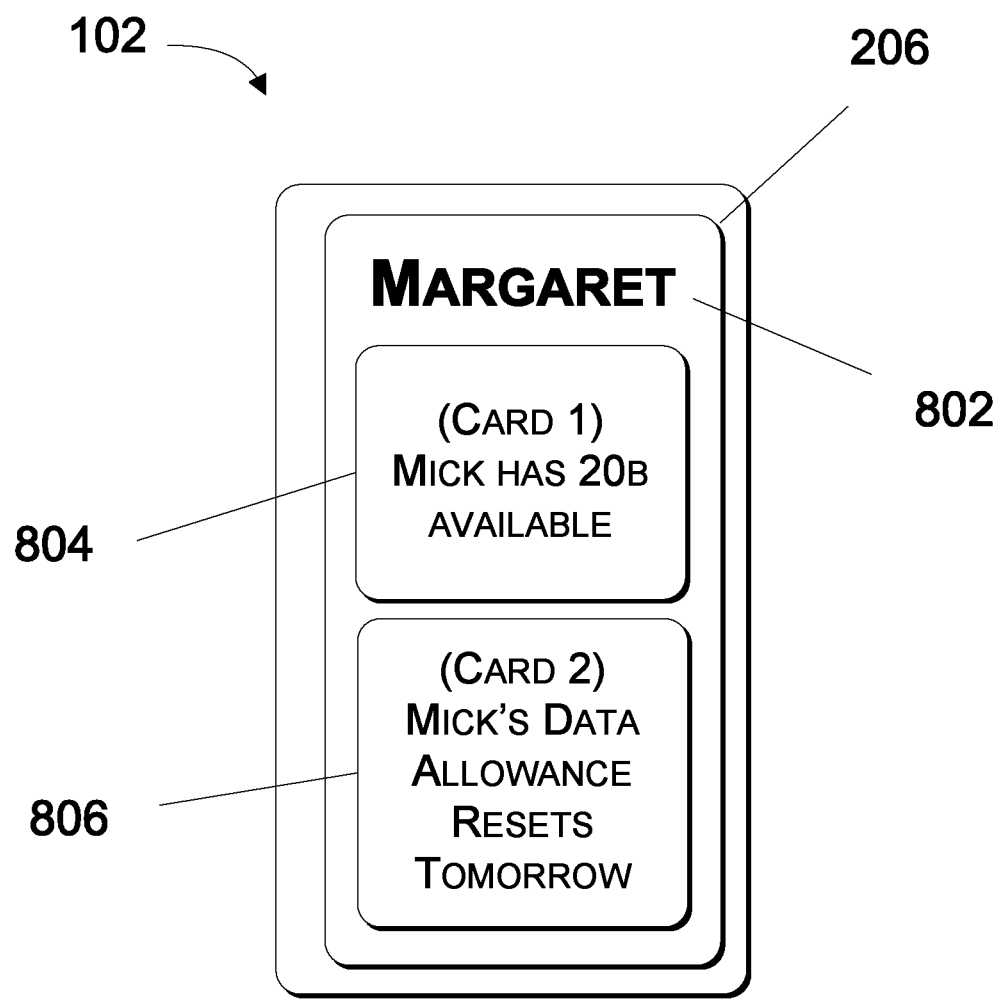
FIG. 8 illustrates an example of a display via a user interface of a user equipment, resulting from requests for cards.

FIG. 8 illustrates an example of a resulting display via the user interface 206 of the UE 102 in accordance with the process 700. In the illustrated example, the UE 102 may belong to a consumer named "Margaret" whose nickname is "Mick."

Margaret's name 802 is shown displayed at the top of the user interface 206. The name "Margaret" and the placement of "Margaret" are examples of facts that may be provided by the facts controller 136 for evaluation of a card definition corresponding to the name and location of its presentation. For example, when the application 222a opens (e.g., automatically when Margaret powers on the UE 102 or selects the application 222a), a request for the card(s) that relate to the name and placement of "Margaret" may be handled by the card engine in accordance with the process 700. The related cards may be surfaced and returned in response to the request, formatted for display via the user interface 206 in accordance with prescriptions made by the provider of the cards (e.g., the telecommunications carrier) or in accordance with preferences chosen by Margaret.

In a similar way, a card 804 (Card 1) and a card 806 (Card 2) may be presented in accordance with initial settings or dynamic requests for cards. For example, Card 1 and Card 2 may be provided by the telecommunications carrier automatically at login by Margaret, as a greeting. In one or more embodiments, Card 1 may have surfaced first in response to a request from the UE 102 at login. In one or more embodiments, Card 2 may have been provided as a response to a call to action by Margaret. As shown in FIG. 8, both Card 1 and Card 2 address Margaret by her nickname "Mick," which may have been provided by Margaret at a time of registration or phone setup, for example, or at any other time. As may be the case with the greeting, information, and/or placement of information in the display via the user interface 206, the nickname may be a fact stored in and/or provided by the facts controller 136 for evaluation of one or more card definitions.

Figure 9:
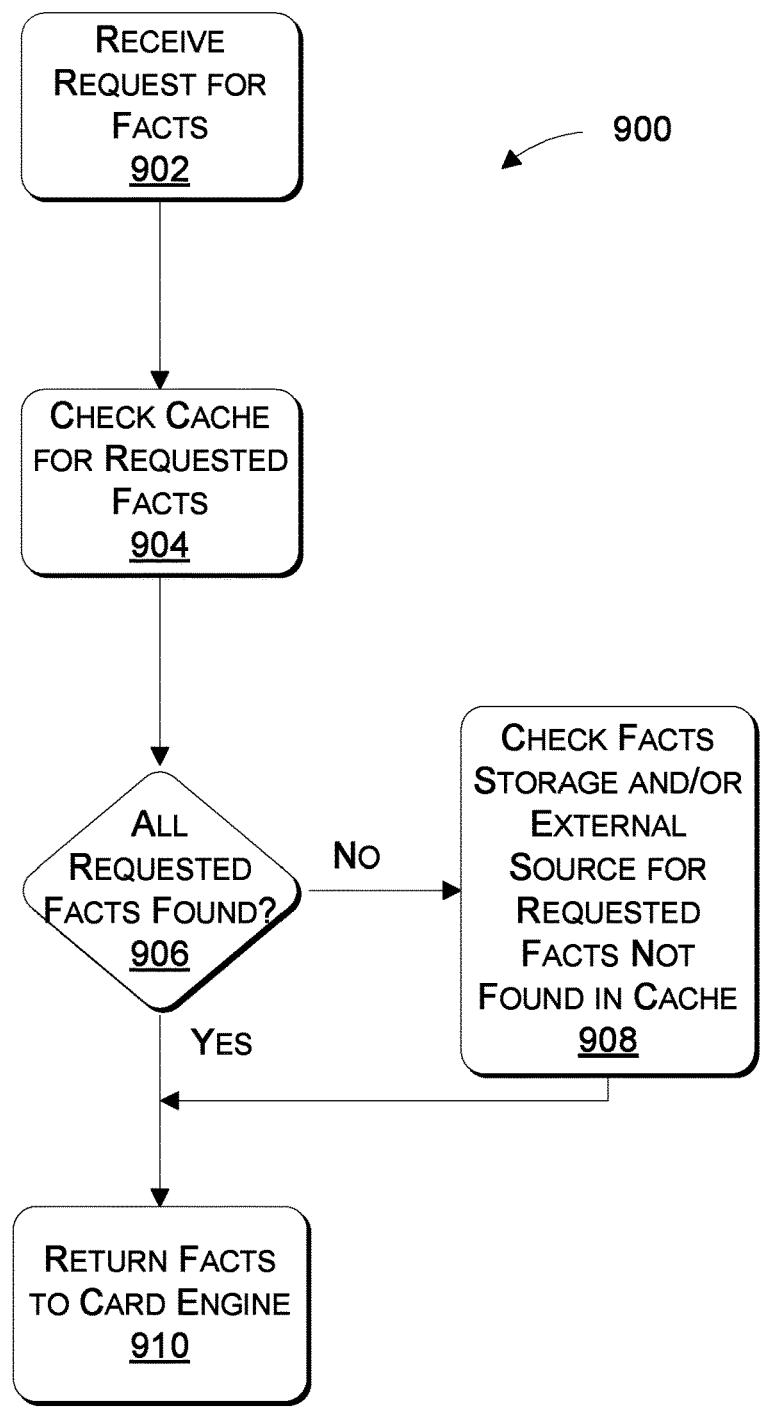
FIG. 9 is a flow diagram of an example process performed at least in part by the facts controller for collecting, receiving, or otherwise obtaining facts and/or data, and making facts available, substantively and in real time.

FIG. 9 is a flow diagram of an example process 900 performed at least in part by the facts controller 136 for collecting, receiving, or otherwise obtaining facts and/or data, and making facts available, substantively and in real time. In one or more embodiments, the facts controller 136 may receive a request for facts related to a given user, check the cache 137 for the requested facts, check the facts storage 138 for facts not found in the cache 137, optionally requesting facts from one or more fact sources external to the facts cache 137 and facts storage 138 to retrieve any facts that may be missing, and returning facts to the card engine to fulfill the request.

At block 902, the facts controller 136 may receive a request for facts. For example, and without limitation, the request for facts may be received from the card engine 132 responding to an action made via the user interface 206 such as user selection (e.g., "click") of a displayed button, text, or other feature or region associated with a hyperlink. In another example, the request for facts may come from the rules engine 140 seeking facts to establish or update rules for the card engine 132 to evaluate card definitions.

At block 904, the facts controller 136 may respond to the request for facts by checking the cache 137 for the presence of one or more of the requested facts. Any requested fact present in the cache 137 may be returned to the card engine 132 by the facts controller 136. However, facts in the cache 137 that meet the values of the requested facts will not be returned under certain circumstances, such as, and without limitation, if the fact has expired or the sensitivity is such that the fact may not be returned.

At block 906, the facts controller 136 may determine whether all requested facts were found in the cache 137 (i.e., the request can be completely fulfilled from the cache). If the facts controller 136 determines that fewer than all facts were found in the cache 137 ("no" at decision block 906), the process may proceed to block 908. At block 908, the facts controller may check the facts storage 138 and/or a source external to the facts storage 138 and cache 137 for the missing facts. Any of the requested facts that are not present in the cache 137 but are found in the facts controller 136 or external source may be returned to the card engine 132. However, any such facts will not be returned if return is prohibited, for example and without limitation, by a sensitivity value.

Facts may be received from an external source as a result of the check at block 908. In some embodiments, a source may set an expiry date/time for the fact or facts, which may override any TTL (Time To Live) set for the cache 137. The source may set the sensitivity as well.

In general, the facts controller 136 may deposit facts received from an external source in the cache 137 and used for any suited purpose, including but not limited to retrieving one or more alerts related to them. The same may be true for facts received from the card engine 132 in the request, from a developer, or from another source. After checking the facts storage 138 and/or external source, the process 900 may proceed to block 910.

If the facts controller 136 determines at decision block 906 that all requested facts were found in the cache 137 ("yes" at decision block 906), the process may proceed to block 910. At block 910, the facts controller 136 may return to the card engine 132 all eligible facts found in the cache 137 at block 904 and all eligible facts found in the facts storage 138 and/or external source at block 908.

Figure 10:
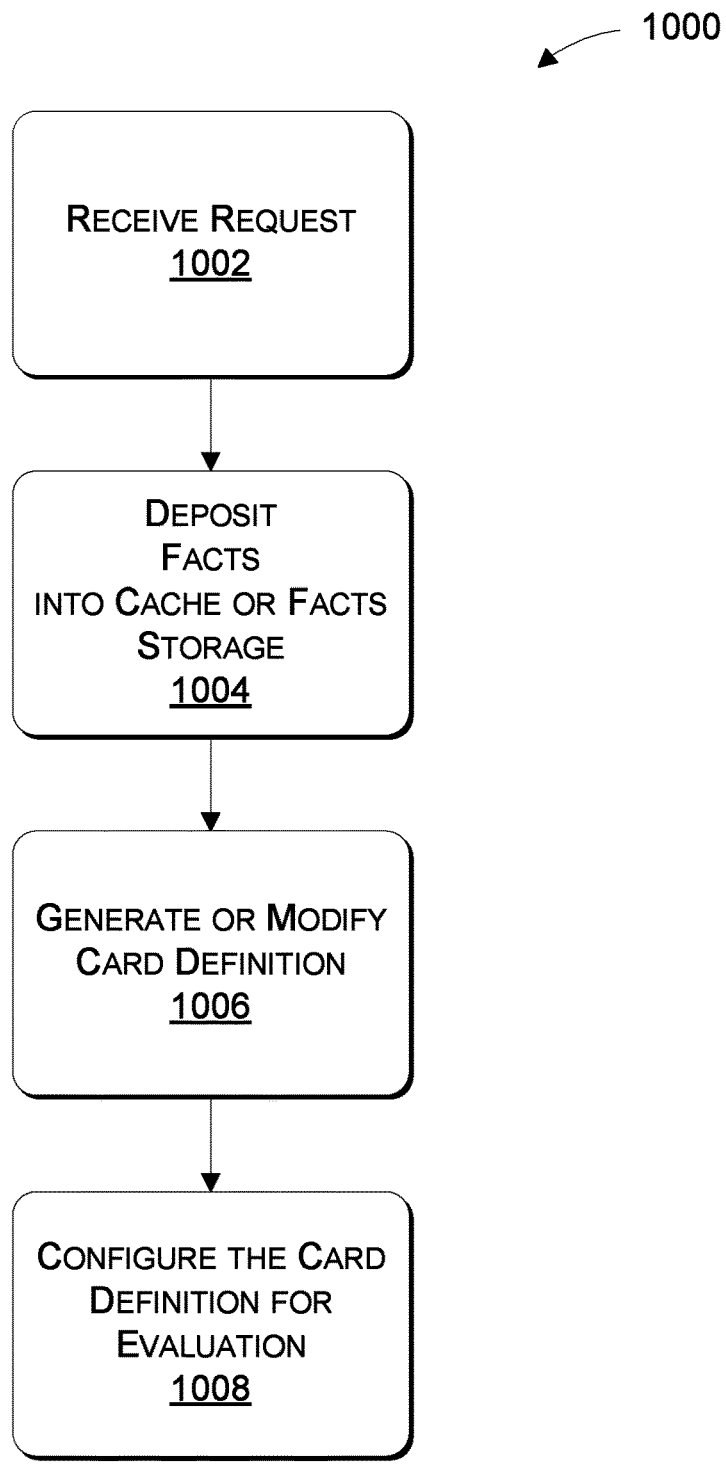
FIG. 10 is a flow diagram of an example process performed at least in part by the rules engine for applying business logic in accordance with rules established for generating or modifying card definitions in response to receiving facts.

FIG. 10 is a flow diagram of an example process 1000 performed at least in part by the rules engine 140 for applying business logic in accordance with rules established for generating or modifying card definitions in response to receiving facts. In one or more embodiments, the rules engine 140 may receive facts from the facts controller 136 or other source, set or adjust card variant weights in accordance with the received facts, and generate or modify card definitions in accordance with the variants and variant weights, In some embodiments, the rules engine 140 may receive facts related to a specific device and retrieve one or more alerts related to those facts.

At block 1002, the rules engine 140 may receive a request, from a source external to the fact storage 138, that includes facts relevant to evaluating a card definition or alert. In some embodiments, the request may be received in response to a query from the rules engine 140. The request may include at least one identifier (e.g., MSISDN, IMEI, or IMSI), an audience, and at least one fact.

At block 1004, facts received with the request may be deposited in the cache 137. Facts may be stored additionally or alternatively in the facts storage 138.

At block 606, the rules engine 140 may generate a card definition or modify an existing card definition by updating the variant weight or weights of the existing card definition in accordance with the received facts. For example, the rules engine 140 may generate a new card definition in response to a developer's CREATE request, or automatically increase the weight of a variant related to a CTA based on an increased frequency of selection by a user.

At block 1008, the rules engine 140 may configure the generated or modified card definition for evaluation, e.g., by the card engine 132. In some examples, the new or modified card definitions may be made available to the card engine 132 by appropriate call in response to a client request for cards as described above, for example. The card definition may then be evaluated using facts available in the cache 137, the facts storage 138, and/or other fact sources as described herein. In this way, the presentation of the cards via the user interface can be dynamically changed substantively and in real time in accordance with the dynamic nature of creating new card(s) or changing variant(s) in response to any of numerous factors as described herein.

Figure 11:
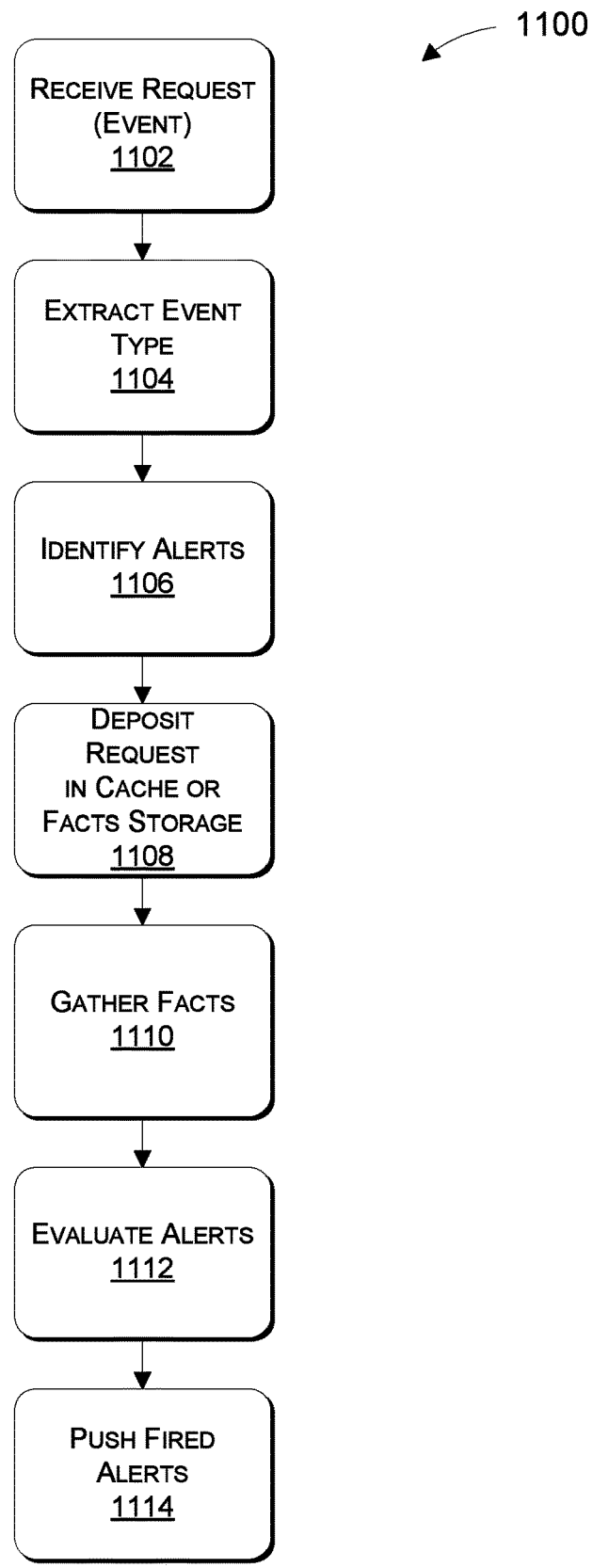
FIG. 11 is a flow diagram of an example process performed at least in part by the rules engine for applying business logic in accordance with rules established for generating and modifying card definitions in response to receiving an event to trigger an alert.

FIG. 11 is another flow diagram of an example process 1100 performed at least in part by the rules engine 140 for applying business logic in accordance with rules established for generating and modifying card definitions in response to receiving an event to trigger one or more alerts. In one or more embodiments, the rules engine 140 may receive an event in a request (e.g., a POST request) and generate or modify card definitions in accordance with the variants and variant weights, In some embodiments, the rules engine 140 may evaluate alerts in accordance with received facts and deliver the alerts in response to a trigger.

At block 1102, the rules engine 140 may receive a request that includes information about an event in response to which one or more alerts may be triggered. The request may include the type of event and one or more of an identifier (e.g., MSISDN, IMEI, or IMSI), an audience, and one or more facts.

At block 1104, the rules engine 140 may extract the event type from the request. The event type may indicate the event that will trigger certain alerts according to a set mapping that may be accessed by the rules engine 140.

At block 1106, the rules engine 140 may identify one or more alerts that are configured to be fired by the event type extracted at block 1104.

At block 1108, the request received at block 1102 may be stored in the cache 137 or the facts storage 138 for subsequent retrieval. For example, facts related to the event may be contained in the request and thus made available for retrieval when evaluating the alerts.

At block 1110, the rules engine 140 may gather additional facts to evaluate the alerts identified at block 1106. Such additional facts may be gathered from the cache 137, the facts storage 138, or an external source such as a library, and may be retrieved by pushed to the rules engine 140.

At block 1112, the rules engine 140 may evaluate the alerts identified at block 1106 using the facts contained in the request and stored in the cache 137 and/or the facts storage 138, and any other facts such as those gathered at block 1110.

At block 1114, the rules engine 140 may push all fired alerts to the user or to a service. String substitutions may be made as needed. In this way, the event that drops may trigger alerts in accordance with the various facts described above, with changes made dynamically and substantively in real time.

Figure 12:
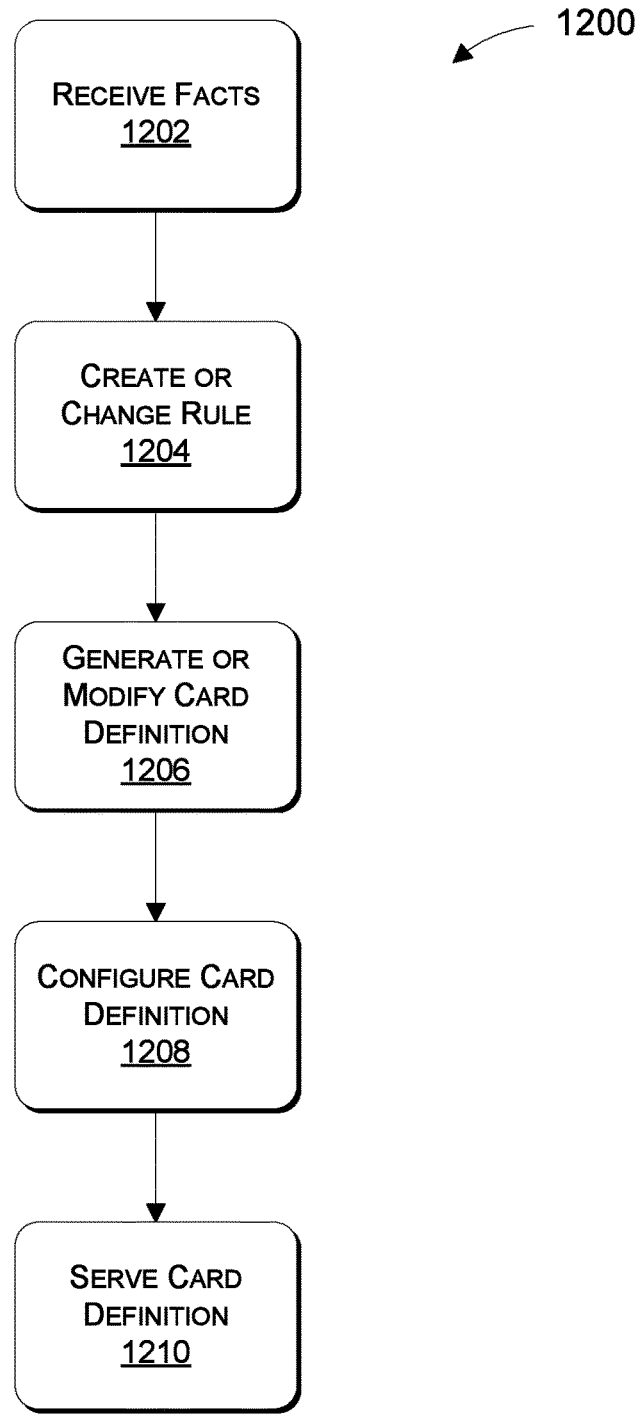
FIG. 12 is a flow diagram of an example process performed at least in part by the rules engine for applying business logic in accordance with rules established for generating and modifying card definitions in response to receiving an input to create or change a rule.

FIG. 12 is a flow diagram of an example process 1200 performed at least in part by the rules engine 140 for applying business logic in accordance with rules established for generating and modifying card definitions in response to receiving an input to create or change a rule. In one or more embodiments, the rules engine 140 may receive an input indicating a change to one or more rules and generate or modify card definitions in accordance with the input.

At block 1202, the rules engine 140 may receive facts from the facts controller 136 or another source. In some embodiments, the facts may be customer-specific unique facts and customer-nonspecific non-unique facts. The rules engine 140 may process the facts to incorporate them into card definitions as described above.

At block 1204, the rules engine 140 may create or change a rule in accordance with an input. In some embodiments, one or more rules are created for the surfacing of a card for display, the card resulting from evaluation of a card definition in accordance with one or more of the collected facts as described above. Additionally or alternatively, the rules engine 140 may receive an input to change one or more of the rules and modify the card definition substantively and in real time in accordance with the input. The modification of the card definition may be in response to user activity indicated in the input to change one or more of the rules. For example and without limitation, if a user indicates lack of interest in a surfaced card by insubstantially (rarely or never) interacting with it, or if the user continually taps to avoid the card, then an appropriate rule may be changed (e.g., by changing corresponding variant weights) so that the card does not surface. In another example, a user may opt out of a particular card, in which case the appropriate rule is changed to prevent that card from surfacing to that user. In yet another example, patterns in the received facts may be analyzed (e.g., by machine learning) to determine, in a dynamic and continually updated fashion, changes in rules based on general user behavior, whether changing or refined.

At block 1206, the rules engine 140 may generate or modify the card definition in accordance with the rule(s) as created or changed according to block 1204. Generating or modifying the card definition may be in accordance with embodiments described herein.

At block 1208, the rules engine 140 may configure the card definition for the card engine 132 in accordance with the generated or modified card definition and in accordance with embodiments described herein.

At block 1210, the card definition may be served, e.g., to the card engine 132 in accordance with embodiments described herein.

Many customer-facing systems work with the same data and could benefit from a common format for that data as they work with it for various purposes such as troubleshooting, alerts, and so forth. Providing a common schema may simplify editing rules, content transforms or messages as those data elements can be easily re-used. Furthermore, consistency and ease in authoring is promoted when, e.g., a developer knows that a desired fact is available, in a certain format, named properly, and easily transformed for a particular use case. In addition, in some embodiments, a common schema may permit easy re-use of existing customer and device data without requiring, e.g., json or xml transforms to be re-written for each new data definition.

The following is a non-limiting example of one suitable common schema:

```
{
  "$schema". "http://json-schema.org/draft-04/schema#".
  "title": "Fact",
  "description": "A 2.0 Fact",
  "javaType" "com.co.alerts.schemas.pojos.shared.newfacts.Fact",
  "type": "object",
  "properties": {
```

-continued

```
    "key": {
        "type": "string",
        "description": "the name of the fact, for example 'customerinfo_rateplan' or 'customer_order_orderstatus'"
    },
    "type": {
        "type": "string",
        "enum": [
            "fact",
            "event"
        ],
        "description": "Whether this is a unique fact (something we know about this customer right now, like rate plan), or whether it's an event, like an order being created, rate plan change, etc."
    },
    "value" {
        "description": "The fact or event data."
    },
    "timestamp": {
        "type": "string",
        "format": "date-time",
        "description": "Time of the event or when the fact was known, If not provided the current time of posting may be used."
    },
    "source": {
        "type": "string",
        "description": "The source system name as a string."
    },
    "expires": {
        "type": "string",
        "format": "date-time",
        "description": "Hard expiry date for the fact or event to be expunged from the cache."
    },
    "subfacts": {
        "type": "object",
        "javaType": "java.util.Map<java.lang.String, java.lang.Object>",
        "description": "Map of subfacts. Subfacts are key value pairs that relate to a primary fact."
    }
    },
    "required": [
        "key",
        "type",
        "value",
        "source"
    ],
    "additionalProperties" false
}
```

Figure 13:
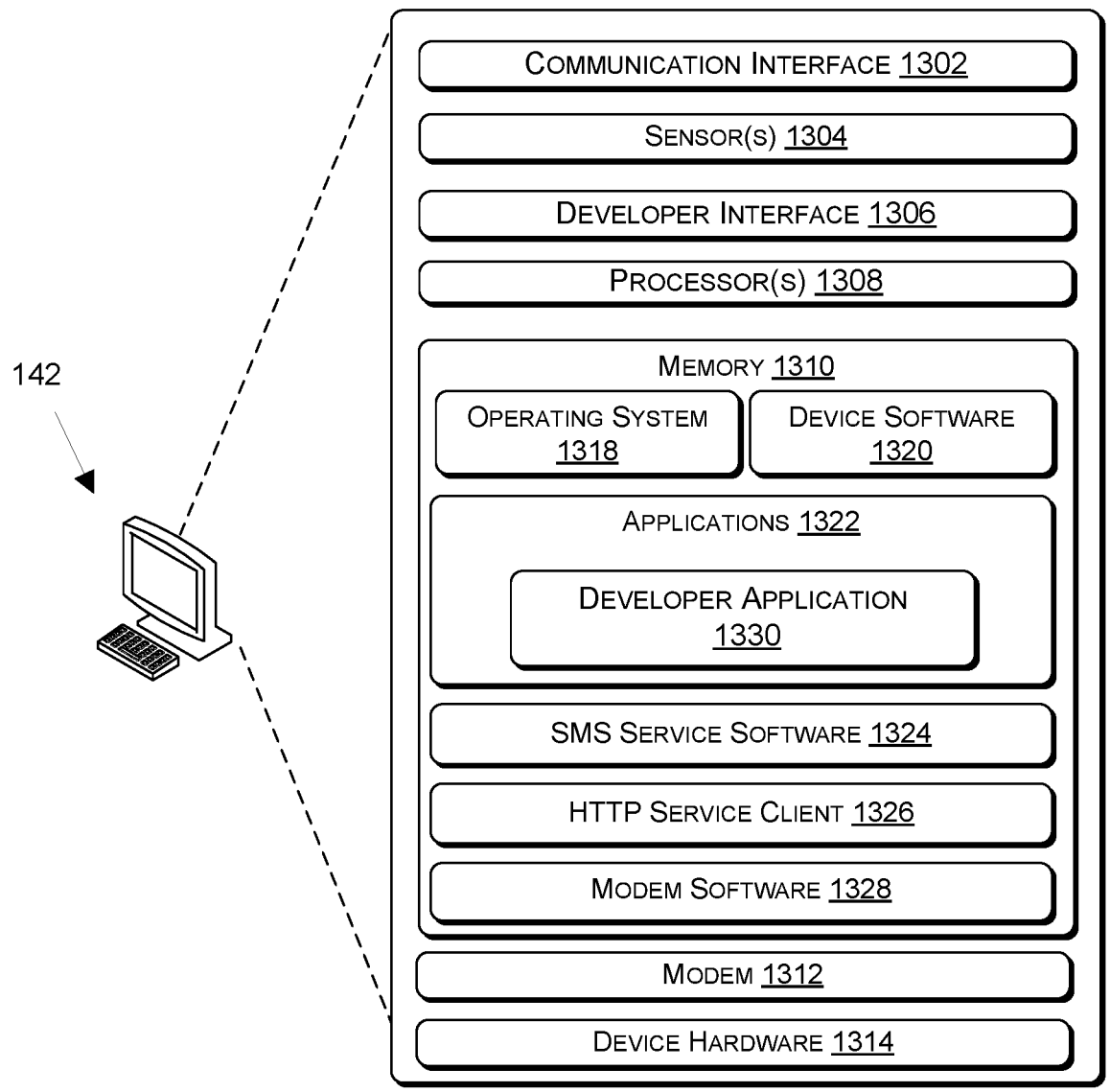
FIG. 13 is a block diagram showing various components of an illustrative developer's computing device.

FIG. 13 is a block diagram showing various components of an illustrative developer's computing device 142. The developer's computing device 142 is in many respects analogous to the UE 102 and may include a communication interface 1302, one or more sensors 1304, a developer interface 1306, one or more processors 1308, a memory 1310, a modem 1312, device hardware 1314, an operating system 1318, device software 1320, one or more applications 1322, SMS software 1324, a HTTP service client 1326, and modem software 1328. The one or more applications 1322 may include a developer application 1330. The illustrated components may function in a manner similar to their corresponding components shown in FIG. 2 and described herein. Thus, to the extent that such a description of the developer's computing device 142 would be essentially redundant, the description is not repeated here.

The developer application 1330 may support an intuitive developer interface by which a developer may author and develop cards (including but not limited to groups, cards, and formatters), manage group and card definitions, perform access control, deploy cards to test, collect metrics (including metrics specific to development), and determine test success. For example and without limitation, the developer application 1330 may enable a developer to create facts, modify existing facts, and set rules for card surfacing.

Figure 14:
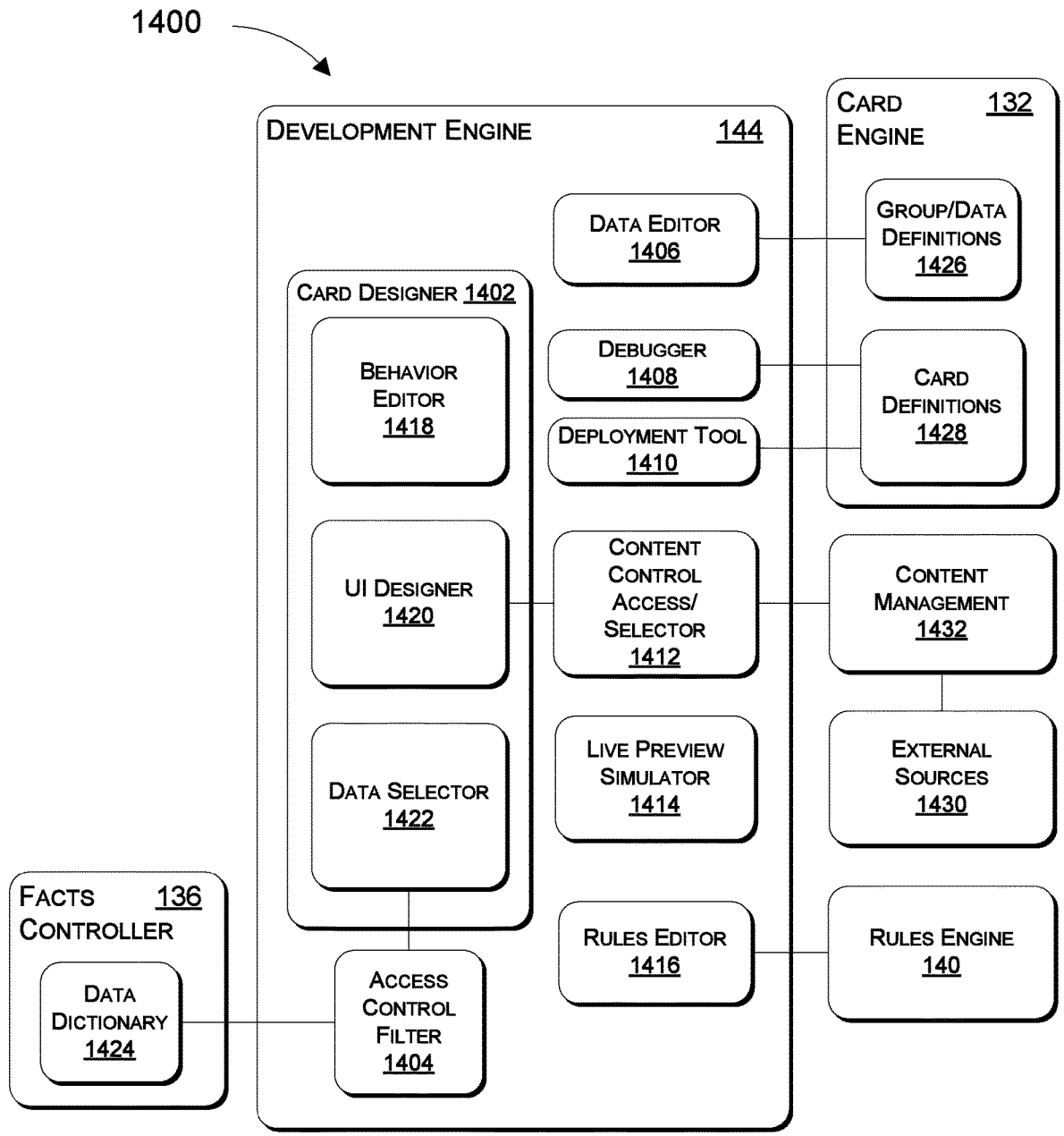
FIG. 14 is a block diagram showing various components of an illustrative development infrastructure including an illustrative development engine.

FIG. 14 is a block diagram showing various components of an illustrative development infrastructure 1400 that includes the development engine 144. In some embodiments, the development engine 144 may include a card designer 1402, an access control filter 1404, a data editor 1406, a debugger 1408, a deployment tool 1410, a content control/access selector 1412, a live preview simulator 1414, and a rules editor 1416. Through the use of the developer application 1330, a developer may avail himself of the card engine 132, the facts controller 136, the rules engine 140, and the development engine 144 to create, update, and/or delete content blocks that may become part of the user experience in the form, by way of example and without limitation, of one or more cards, banners, pages, legal text, buttons, menus, and/or other content.

The card designer component 1402 may include a behavior editor 1418, a user interface (UI) designer 1420, and a data selector 1422. As a card may be authored once and yet included many times in groups in accordance with group definitions, the behavior editor 1418 may be utilized by the developer to, e.g., edit card behavior by appropriate input via a developer interface, an example of which is described below. In some embodiments, card behavior may be edited using pseudocode input, which may be interpreted and used to evaluate a card definition to surface the desired card as described herein. The behavior editor 1418 may be used to edit other types of content blocks in a corresponding fashion.

The UI designer 1420 may be utilized by the developer to design the user interface (e.g., the user interface 206) of the UE 102. In some embodiments, the UI designer 1420 may cooperate with the content control/access selector 1412 and, in accordance with requests placed by the developer via the developer application 1330, provide style to the user interface 206. For example and not by way of limitation, the UI designer 1420 may request and receive such content as advertisements or chrome (e.g., visual design elements) that accompany content in the surfaced card.

The data selector 1422 may obtain data from a data dictionary 1424 maintained by the facts controller 136. The data dictionary 1424 stores sources and formats of fields for given facts. Access to the data dictionary 1424 is controlled by the access control filter 1404 in some embodiments. With access control, developers can be constrained in terms of the data they may obtain as well as in terms of the data that they may add to cards, for example. Thus, sensitive data that is restricted by law or by user or company preference may be filtered and unavailable for access by developers, and/or data that may compromise other aspects of the user experience (including but not limited to data that should not affect facts or rules utilized in evaluating card definitions unrelated to a developer's function) may be rejected.

The data editor 1406 may be utilized by the developer to dynamically change the definition of a group and, correspondingly, the definition of a container. In some embodiments, a developer is enabled, for example, to tailor content to be displayed in a particular way for individual clients by editing (i.e., adding, deleting, or updating) various fields with which instances are created as described above. Thus, for example, group definitions may be edited by changes to tags, container type, conditions, fact name, or the like. Group/data definitions 1426 may be evaluated accordingly by the card engine 132, substantively and in real-time, permitting quick testing, debugging, and deployment.

The debugger 1408 is configured to facilitate debugging in conjunction with the creation, deletion, and/or updating of card definitions 1428. In some embodiments, new or updated content may be surfaced for preview (for example, by the live preview simulator 1414) before deployment, including live data accessed according to rules that may be created by the developer and enforced by the rules engine 132. Previewing may be configured for different channels such as a smartphone, a tablet, or a laptop. Viewing may be done by emulation or via a web network, for example.

In some embodiments, the developer application 1330 may be deployed to a test network and debugging may be performed as changes in the user experience (including but not limited to specific content blocks) may be seen in real time in response to changes in group and/or card definitions. Deployment to a test network may be by operating-system-level virtualization, in which applications, libraries, or groups of source code can be executed as a unit (e.g., using so-called "container technology," which is not to be confused with the description and use of containers as set forth elsewhere herein).

Moreover, metrics (especially, metrics related to development) may be collected and reports generated in real-time in accordance with deployment to, e.g., confirm that the developer application 1330 performs as expected, with integrity checks as appropriate. In some embodiments, integrity checks may be conducted "on the fly" along with the collection of metrics and/or generation of reports.

The deployment tool 1410 is configured to deploy content considered ready for surfacing, either for testing, simulating, or production (live). In some embodiments, the deployment tool 1410 may deploy to production for server and various channels at the same time, such that the same content may be customized and served (or configured to be served) to a smartphone, a tablet, or a laptop and analyzed at once, for example. In this way, modifications to the content may be made by the developer via the developer interface 1306 as needed based on the user experience, enabling substantive, real-time patching and deployment in short order. In many instances, the current display need not be taken down entirely to make specific substantive changes; the updated display may occur nearly immediately as the changes are noted and patches installed. Similarly, as a consequence of supporting changes dynamically, the live version may be recalled or killed as soon as the need arises, simply by making appropriate changes to card and/or group definitions.

The content control/access selector 1412 may be configured to control access to content from external sources 1430 under control of a content management component 1432. As indicated above, the UI designer 1420 may request and receive from the content management component 1432 such content as advertisements or chrome (e.g., visual design elements) that accompany content in the surfaced card. The content may be supplied from external sources 1430.

The rules editor 1416 may provide to the rules engine 140 rules created or modified by the developer using the developer application 1330, and may direct deletion of rules as well. Such changes may be made based on real-time reporting of views, A/B tests, click-throughs, which customers receive which experience, and the like. In some embodiments, user interactions with content displayed via the user interface 206 may be tracked and the associated captured data analyzed in real-time and reported to the developer for action as needed. Non-limiting examples of interactions may include user experience delivery, views, click-through rates, overall usage of card over a time interval, or detailed per-card usage on a per-device basis.

For example and not by way of limitation, rules to be followed by the rules engine 140 may be generated, deleted, or modified by the developer via the rules editor 1416 that, e.g., refine existing conditional statements that control delivery of cards to the client, and/or change the weighted-value calculation assigned to variants of a card as described herein based on the inferred client behavior. In some examples, even stylistic preferences of the user may inform the rules engine 140 to weigh those preferences above others when assigning weighted-values to variants of a card. By modifying these and/or other elements of a card or container/group, a developer may thus change rules and rulesets to be enforced by the rules engine. The developer also, in some embodiments, may change the weights directly via the developer interface 906 in accordance with the present description.

Figure 15:
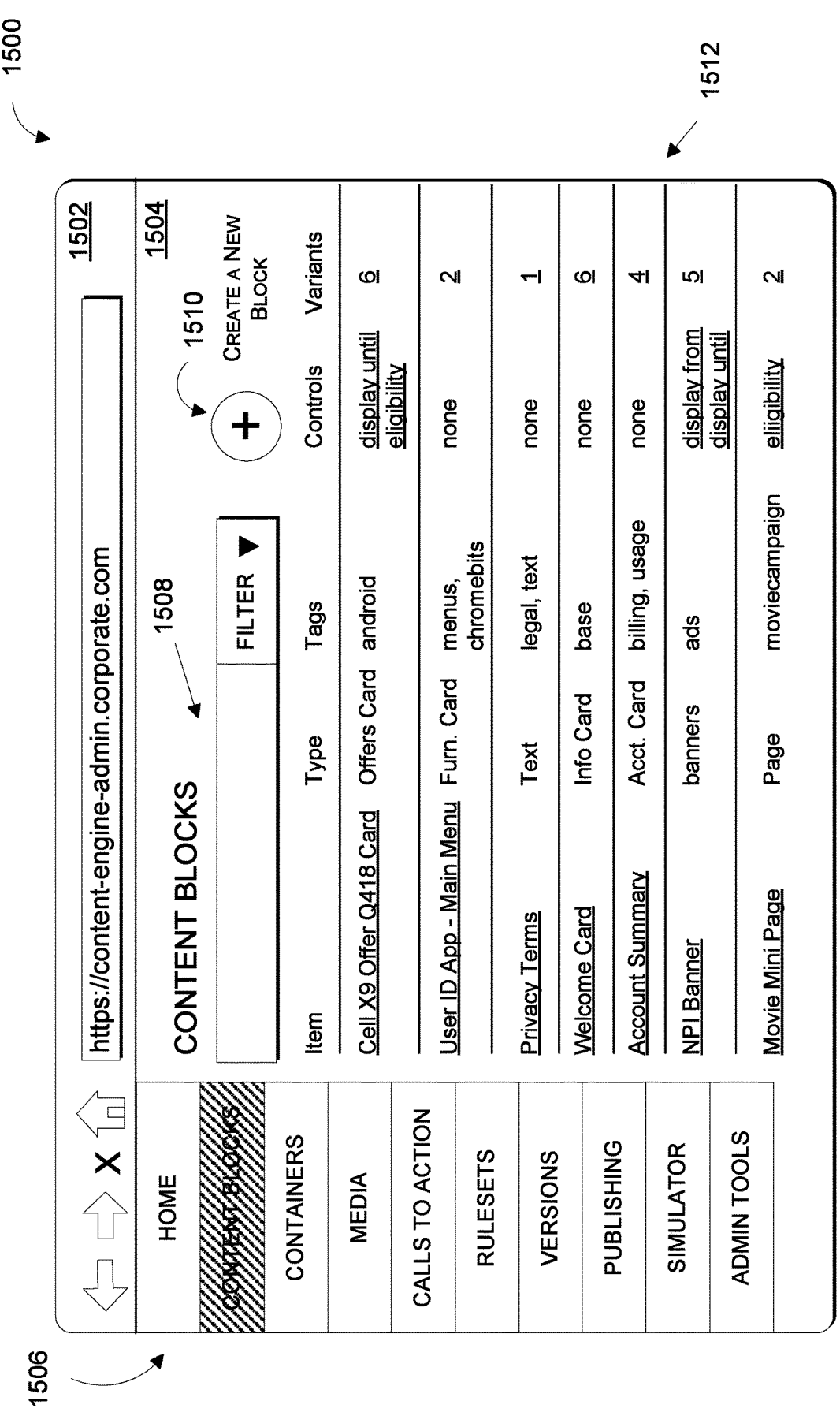
FIG. 15 illustrates an example of a browser screen of a developer interface that may be utilized by a developer to access the development engine via the developer application.

FIG. 15 illustrates an example of a developer interface (browser) screen 1500 of a developer interface 1306 that may be utilized by a developer to access the development engine 144 via the developer application 1330.

The illustrated developer interface screen 1500 may include a navigation section 1502, an input section 1504, and a menu section 1506. The navigation section 1502 may include one or more navigation buttons and/or an address bar, for example. The input section 1504 may include portions in which various fields may be specified. The menu section 1506 may include a number of buttons to access different development areas made accessible by the development engine 144 via the developer application 1330. Input may be made via the developer interface 1306 via any method including, but not limited to, a mouse, touch screen, keyboard, etc. suited to the interface, computing hardware, and software.

In the illustrated example, the "content blocks" button has been selected as indicated by the hashed "highlighting" in the menu section 1506. Accordingly, the input section 1504 includes portions relevant to content block creation, deletion, or modification, e.g., a content box 1508, an add button 1510, and a content block section 1512. The content box 1508 may be configured for a developer to enter information (e.g., by typing characters into the content box) to create, delete, or modify one or more content blocks. The add button 1510 may permit the developer to create a new content block via the content box 1508. The content section 1512 may show one or more content blocks currently available to the developer to access for modification or deletion. New content blocks created by the developer via the content box 1508 may appear in the content section upon creation.

In some embodiments, the content blocks screen may be the main place in which to create, delete, and modify content made accessible by the development engine 144. Without limitation, a content block may refer to any content to include in the user experience, such as a card, a banner ad, a page, legal text, a button, menu, etc. A content block may be given eligibility criteria, display from/until dates, and other features, and may be used multiple times.

FIG. 15 illustrates some examples. The table shows columns indicated certain features of each content block available to the developer, including "item", "type", "tags", "controls", and "variants". Other information may be included in the table, either by default or by accessing an extended menu by methods familiar to one of ordinary skill in the art. For example and without limitation, such information may include "author name", "placement" of the content in the user interface 206 of the UE 102, and number of published or unpublished "versions", which may include a link to roll back versions, items, and/or actions logged against users for later auditing.

Figure 16:
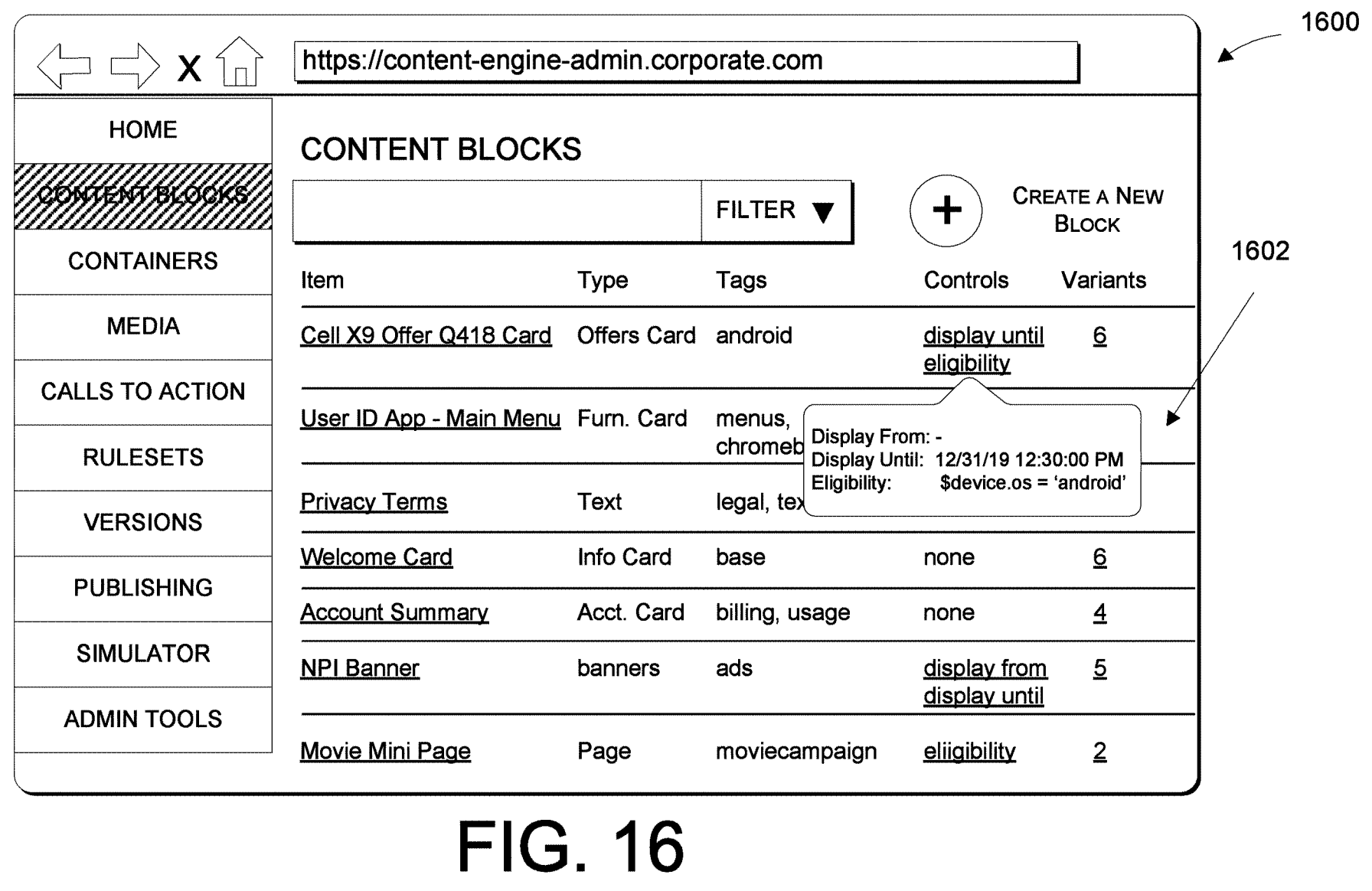

FIG. 16 illustrates an example of a developer interface screen 1600 that may be displayed via the developer interface 1306 in response to developer selection of the control "display until eligibility" 1602 in the content block "Cell X9 Offer Q418 Card". In accordance with the selection, the developer is informed that the content block is set to display until Dec. 31, 2019 at 12:30:00 PM. No date/time is set for the beginning of display because, e.g., the corresponding content will currently be displayed on occurrence of a trigger. The selection of the control also reveals that the content block is displayed to devices running the Android operating system.

In accordance with aspects and embodiments described herein, details of a content block may be revealed but also created, deleted, or modified via the developer interface screen 1600. For example and without limitation, developer selection of a content block or any portion thereof may permit modification or deletion of the content block or portion.

Figure 17:
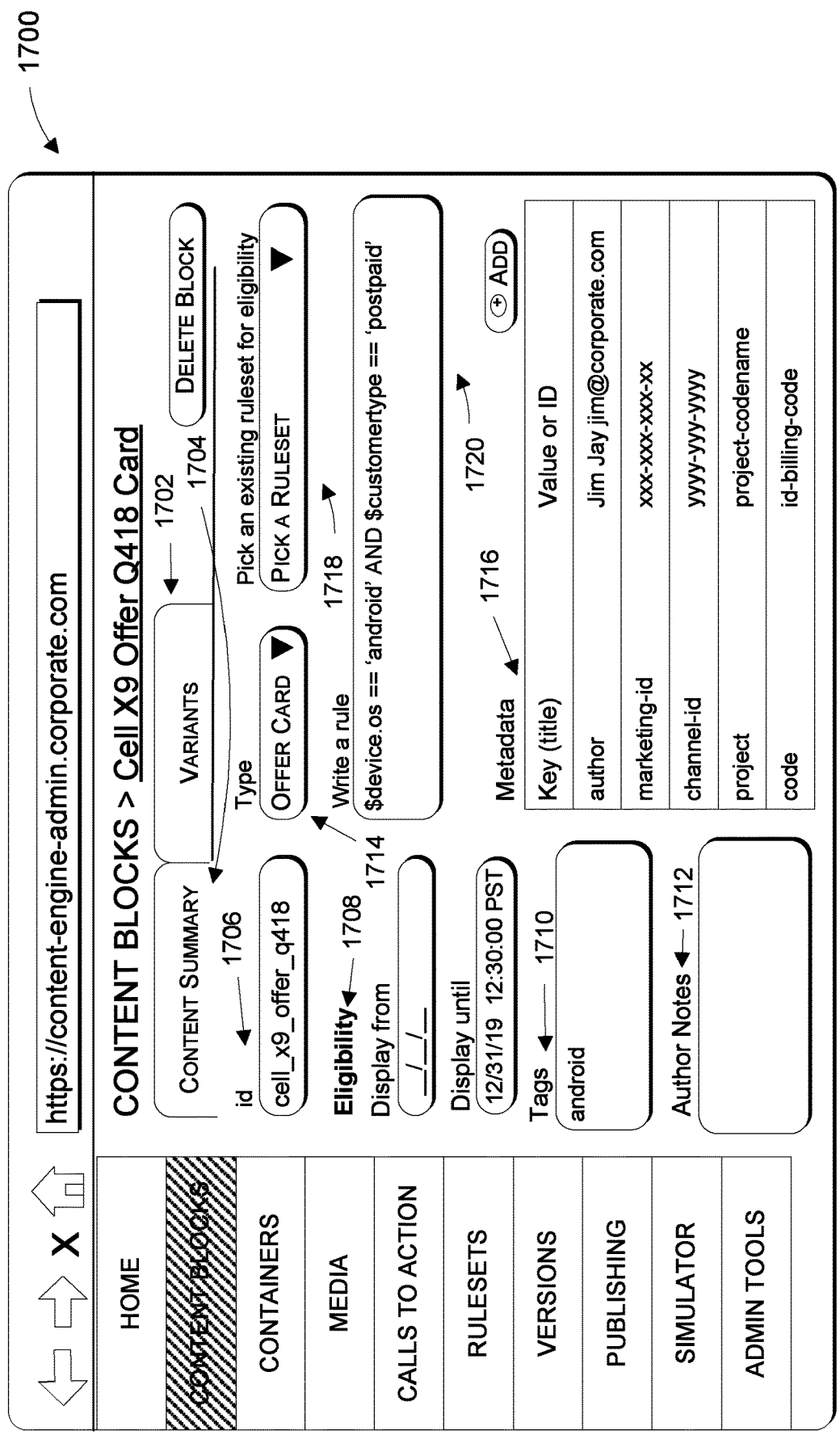
FIG. 17 shows an example of a developer interface screen that may result from developer selection of a given content block.

For example and without limitation, FIG. 17 shows an example of a developer interface screen 1700 that may result from developer selection of the content block Cell X9 Offer Q418 Card. In response to the selection, the screen 1700 may appear showing information about the selection card. As illustrated in FIG. 17, the developer interface screen 1700 may include a content summary tab 1702 and a variants tab 1704 that may be selected by the developer. The content summary tab 1702 is shown selected in FIG. 17 and may include one or more fields including the id 1706, eligibility information 1708 (including "display from" and "display until" information), tags 1710, notes 1712, type 1714, and metadata 1716 in an interactive, editable fashion. In addition, the developer interface screen 1700 shows an input 1718 by which a developer may pick a ruleset for eligibility for the rules engine 140 to enforce, and an input 1720 by which the developer may enter a rule (i.e., separately from one of the predefined rulesets) for the rules engine 140 to follow. In one or more embodiments, a rule may be entered as text into the input 1720.

FIG. 18 illustrates an example of a developer interface screen 1800 corresponding to the developer interface screen 1700 but with the variants tab 1702 selected. FIG. 18 shows four variants corresponding to the current content block, although any number, including zero, of variants may be present and/or displayed.

In the example of FIG. 18, the variants tab 1702 of FIG. 17 shows a table 1802 having, for each variant, a corresponding trigger, audiences, payloads, CTAs, template, and weight. Underlines for the variant and CTAs indicate links to the information for each. Upon developer selection of a link, editable information corresponding to the linked data may be displayed in a manner similar to that shown in FIG. 17.

Referring to the first variant ("variant_1") in the table, the card Cell X9 Offer Q418 Card (id=cell_x9_offer_q418) may be designed to surface in response to a request from a customer whose account is postpaid. That is, the offer card having the variant corresponding to a postpaid customer may be presented via the user interface 206. Similarly, a prepaid customer (corresponding to variant 2), a customer having an unknown customer type, and a minor customer may be shown the card. It should be noted that surfacing of the card may be subject to more than one factor in addition to customer type or other variant.

Figure 19:
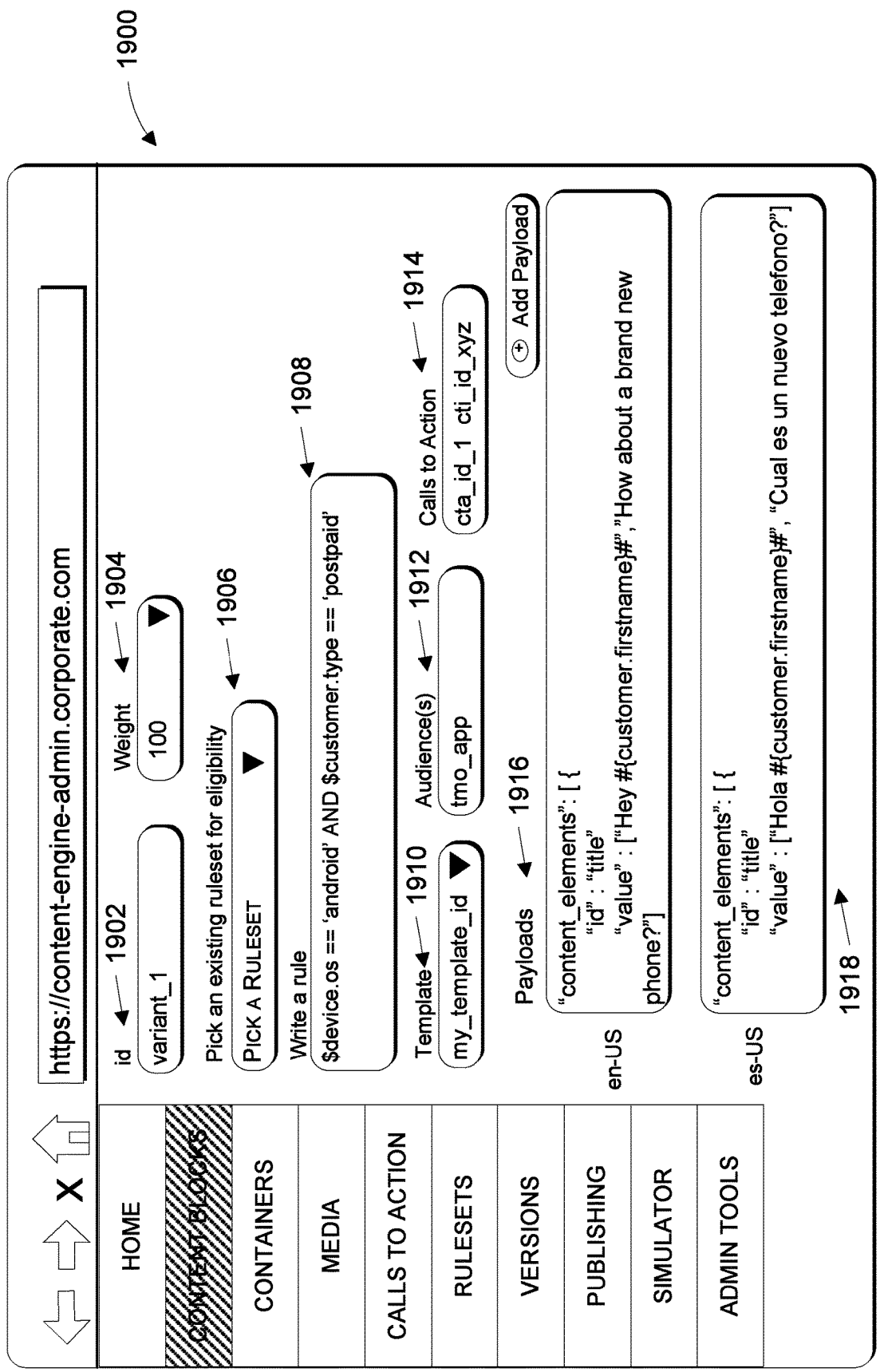
FIG. 19 illustrates an example of a developer interface screen that may result from developer selection of a variant from the user interface.

FIG. 19 illustrates an example of a developer interface screen 1900 that may result from developer selection of a given variant from the screen 1400. In FIG. 19, the developer has selected variant 1, and thus fields corresponding to the variant's id 1902 and weight 1904, a ruleset selection 1906, a rule writing input 1908, a template 1910, an audience 1912, CTAs 1914, and payload inputs 1916 and 1918 are presented. In one or more embodiments, rules entered via the rule writing input 1908 and/or payloads entered via the payload inputs 1916 or 1918 may be text.

Figure 20:
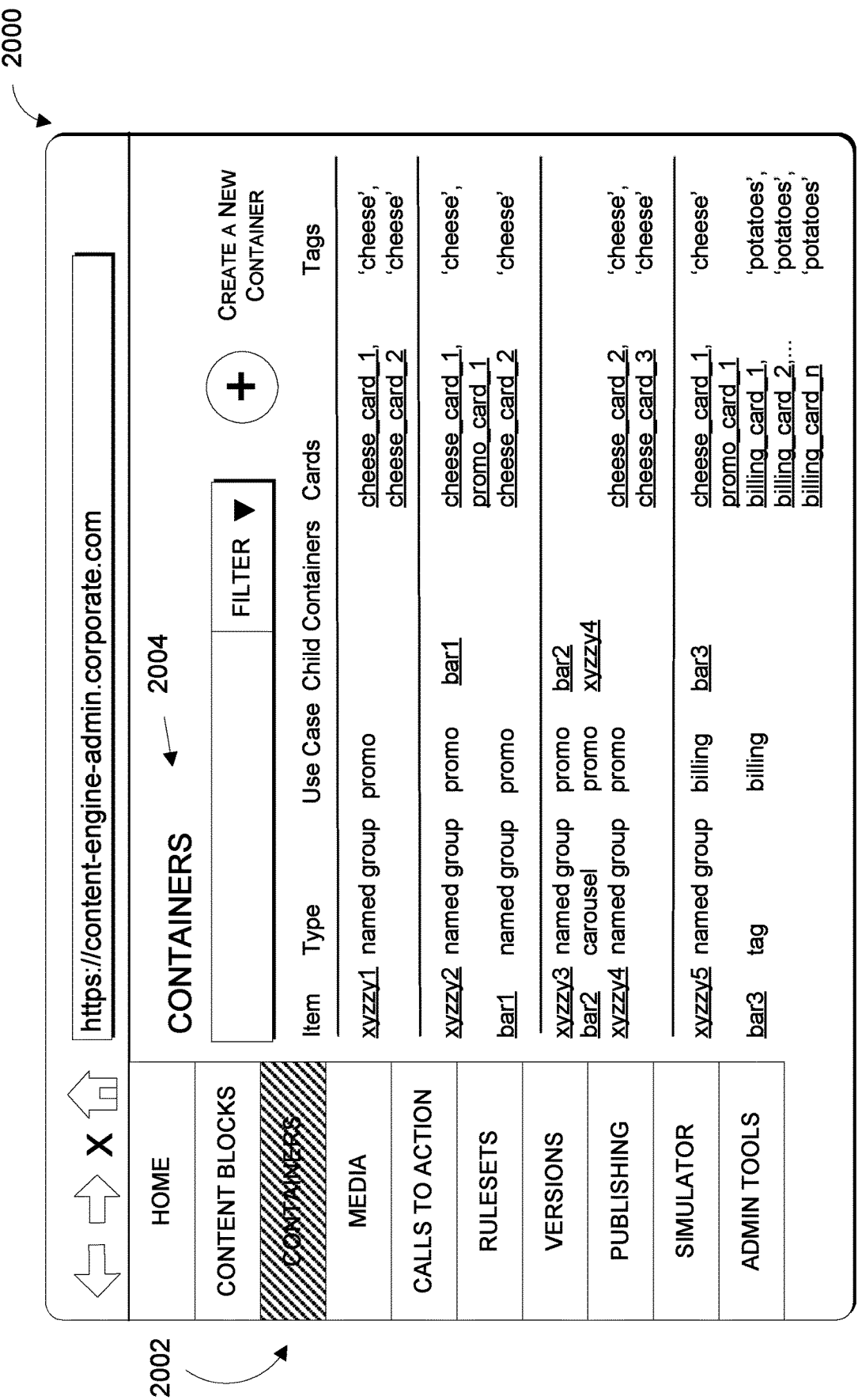
FIG. 20 illustrates an example of a developer interface screen that may result from developer selection of "containers" made accessible by the development engine.

FIG. 20 illustrates a developer interface screen 2000 that may result from developer selection of "containers" 2002 of the menu section 1506. As shown, the developer interface screen 2000 may have an input box 2004 by which a developer may enter information regarding a container (e.g., information to create, delete, or modify a certain container) and a content section 2006 that may show containers that may be currently accessed by the developer. In the illustration, the content section 2006 may be a table listing the type of container, use case, child containers, cards, and tags that may correspond to an identified container. Underlines shown in the figure may represent links to information corresponding to the linked data.

In FIG. 20, examples of four array containers are shown. In one example, xyzzy1 may be a named group container for a promotion (use case is promo). The container xyzzy1 has two cards, cheese_card_1 and cheese_card_2, each of which has the tag 'cheese'. Assuming that both of cheese_card_1 and cheese_card_2 are available to be returned, both may surface in accordance with evaluation processes described herein.

In a second example, xyzzy2 may also be a named group container for a promotion. The container xyzzy2 contains a named group container bar1 and the cards cheese_card_1 and promo_card_1. Named group container bar1 is also a named group container of use case promotion and has a card cheese_card_2. In this example, promo_card_1 may be invisible and cheese_card_2 being the only card in xyzzy2 may surface in accordance with evaluation processes described herein.

In a third example, xyzzy3 may also be a named group container for a promotion. The container xyzzy3 contains a carousel container bar2 (use case, promotion) which contains a named group container xyzzy4 (use case, promotion). Named group container xyzzy4 has the cards cheese_card_2 and cheese_card_3. In this example, both of cheese_card_2 and cheese_card_3 may surface in accordance with evaluation processes described herein.

In a fourth example, xyzzy5 may be a named group container for a billing use case. The container xyzzy5 may contain a tag container bar3 and the cards cheese_card_1 and promo_card_1. The tag container bar3 may contain a card cheese_card_2 and all billing cards billing_card_1, billing_card_2, . . . billing_card_n having the tag 'potatoes'. In this example, promo_card_1 may be invisible, whereas cheese_card_1 and all cards billing_card_1 . . . n are eligible to surface in accordance with evaluation processes described herein.

A "contents block" area and a "containers" area made accessible by the development engine 144 via the developer application 1330 have been discussed. Were another button to be selected by the developer from the menu section 1506, a different developer interface screen may appear that has fields corresponding to the viewable or editable items of the corresponding area. For example and without limitation, the menu section 1506 may provide access to a "media" area, a "calls to action" area, a "rulesets" area, a "versions" area, a "publishing" area, a "simulator" area, and an "administrator tools" area where data related to media, CTAs, rules and rulesets, versioning, publishing, simulation, and administration, respectively may be created, deleted, and/or modified. Consequently, a developer may create, delete, and modify groups/containers dynamically, providing new capabilities including on-the-go changing, testing, and publishing of cards using a simpler, more intuitive developer interface 1306 to achieve these and other objectives.

The various developer interface screens illustrated in FIG. 15-FIG. 20 are merely several examples that may be suitable for use by a developer to perform one or more of the functions described herein. Other screens having different functional elements, chrome, style, etc. may be used depending on needs, preferences, technical environment, and other facts. Thus, the illustrated screens should not be considered limiting in any way.

Further, the abovementioned fields are described by way of example only. One or more of them may be omitted entirely or under circumstances in which they are not relevant. In addition or alternatively, one or more different fields may be included. Some or all of the fields may be text-editable or editable via a menu (such as a drop-down menu).

Figure 21:
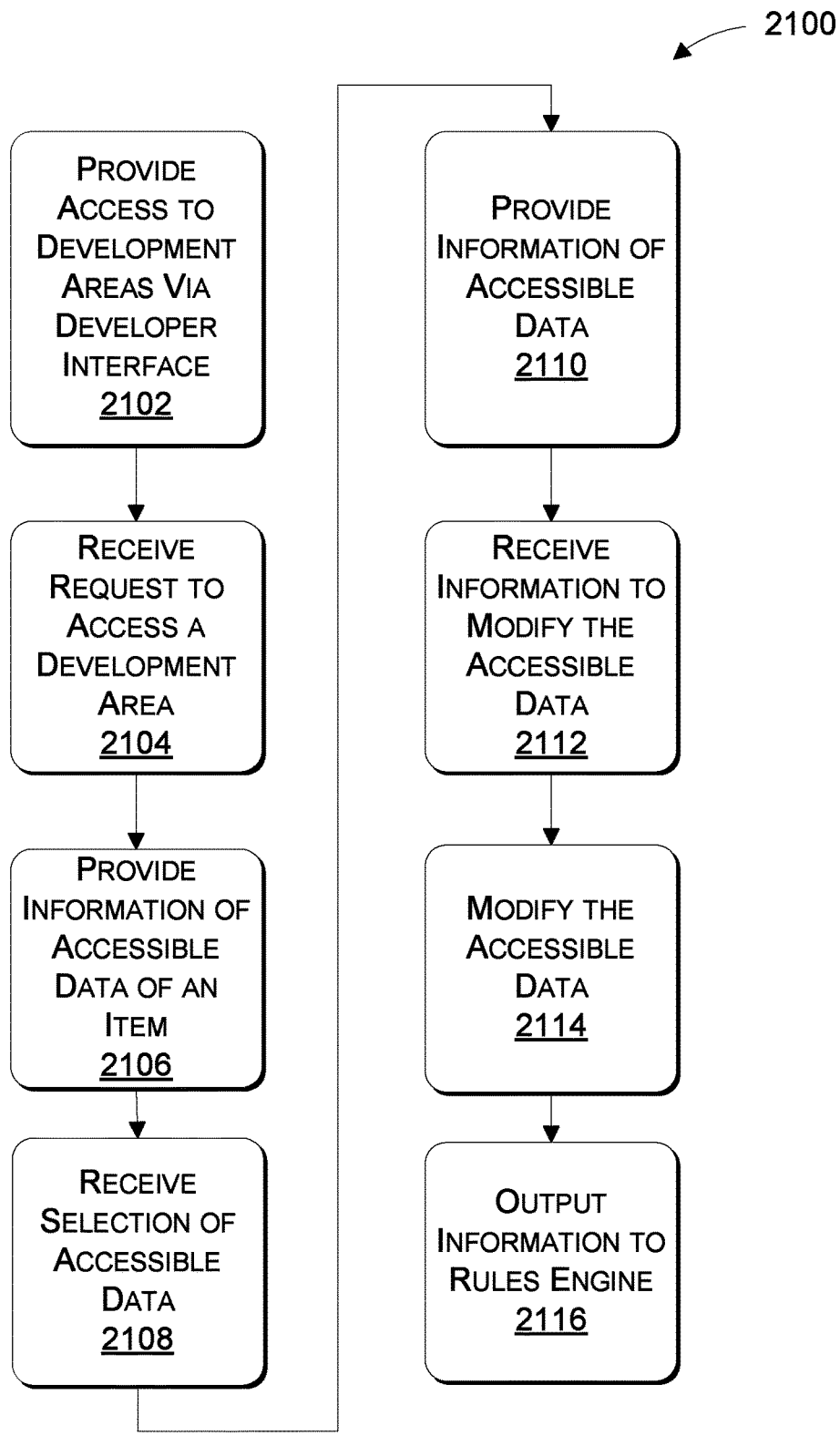
FIG. 21 is a flow diagram of an example process performed at least in part by the development engine for enabling the developer to add, delete, or modify rules or details of cards and containers that impact the generation of rules enforced by the rules engine.
Figure 22:
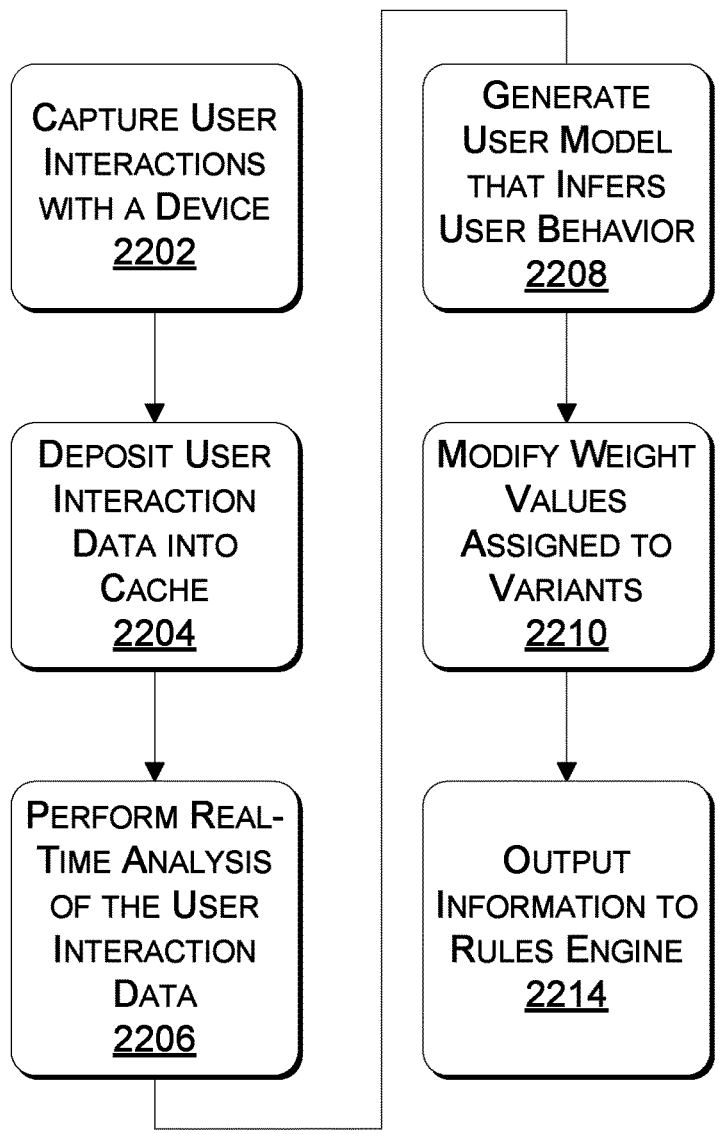
FIG. 22 is a flow diagram of an example process performed at least in part by the development engine to modify weight values of variants that impact the generation of rules enforced by the rules engine in accordance with a user model derived from user interactions made via the user equipment.
Figure 23:
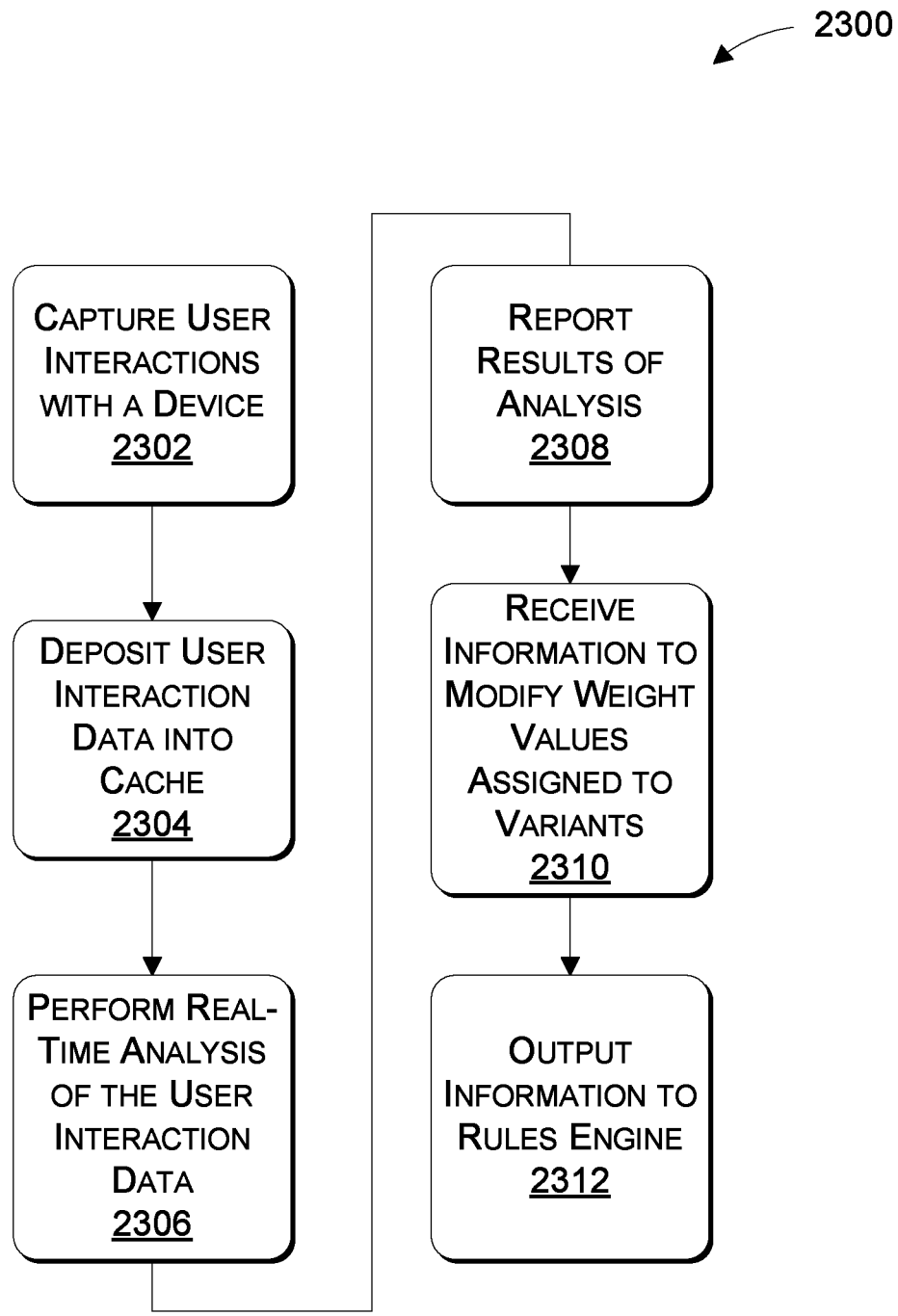
FIG. 23 is a flow diagram of an example process performed at least in part by the development engine for enabling the developer to modify weight values of variants that impact the generation of rules enforced by the rules engine in accordance with a report of user interactions made via the user equipment.

FIGS. 21-23 present illustrative processes for implementing the development engine 144. The processes are illustrated respectively as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the network architecture 100 of FIG. 1.

FIG. 21 is a flow diagram of an example process 2100 performed at least in part by the development engine 144 for enabling the developer to add, delete, or modify rules or details of cards and containers that impact the generation of rules enforced by the rules engine. In one or more embodiments, the development engine may enable a developer to access the development engine 144 via the developer application 1330 resident on the developer's computing device 142.

At block 2102, the development engine may provide a developer with access to development areas made accessible by the development engine 144 via the developer interface 1306 and developer application 1330. In some embodiments, the development areas may include one or more of the areas indicated by the menu section 1506.

At block 2104, the development engine may receive a request to access a development area. In some embodiments, the request may be made by the developer clicking on one of the buttons in the menu section 1506.

At block 2106, the development engine 144 may provide information of data of an item made accessible to the developer. In some embodiments, the information is provided in response to selection of a button in block 2104. The information may take the form of one or more developer interface screens such as one of the developer interface screens 1500, 1600, 1700, 1800, 1900, or 2000 described above, corresponding to the selected button. Thus, the data made accessible may include content block (e.g., card, ad, text, etc.) information such as item name, type, tags, controls, and/or variants in the example shown in FIG. 15, or other information.

At block 2108, the development engine 144 may receive a selection of accessible data. In some embodiments, the selection may be made by the developer clicking information provided in block 2106. For example and without limitation, the item name, control, or variants may be selected.

At block 2110, the development engine 144 may provide information of accessible data corresponding to the selection received in block 2108. In some embodiments, the provided information may be a popup or a new screen showing static information (such as the control information shown in FIG. 16 resulting from selection of the corresponding link in the screen 1500) or one or more opportunities to modify accessible data (such as the options to change content block eligibility 1708, type 1714, pick a ruleset at the input 1718, or write a rule at the input 1720 shown in the content summary tab 1704 on the developer interface screen 1700 shown in FIG. 17). In addition or alternatively, the provided information may be a new screen showing one or more additional opportunities to select and access additional accessible data (such as the options to select a variant or CTA shown in the variants tab 1704 on the developer interface screen 1800 shown in FIG. 18).

At block 2112, the development engine 144 may receive information to modify the accessible data of the item. In some embodiments, the information may be provided by the developer by input to the developer interface screen (e.g., the developer interface screen 1700), such as by selecting an item, its controls, and/or its variants. For example and without limitation, the received information may be a new rule entered via the input 1720 or a variant selected from the screen 1800.

At block 2114, the development engine 144 may modify the accessible data in accordance with the received information. For example and without limitation, the development engine 144 may newly associate a rule entered by the developer with the item being modified.

At block 2016, the development engine 144 may output information corresponding to the rule newly associated with the item in block 2114. In some embodiments, the information is output to the rules engine 140 to be enforced.

FIG. 22 is a flow diagram of an example process 2200 performed at least in part by the development engine 144 to modify weight values of variants that impact the generation of rules enforced by the rules engine 140 in accordance with a user model derived from user interactions made via the UE 102.

At block 2202, the development engine 144 may capture user interactions with the UE 102. Non-limiting examples of interactions may include user experience delivery, views, click-through rates, overall usage of card over a time interval, or detailed per-card usage on a per-device basis.

At block 2204, the development engine 144 may deposit the data of the user interactions into the cache 137. In some embodiments, the data may include unique and/or non-unique facts as described herein and may be made available to one or more of the card engine 132, facts controller 136, and/or rules engine 144.

At block 2206, the development engine 144 may perform real-time analysis of the user interaction data. In some embodiments, the analysis may relate to user interactions that may indicate user behavior, e.g., with respect to particular cards (such as, and without limitation, which cards were delivered to a user, which cards were viewed by the user, and/or which cards were dismissed by the user).

At block 2208, the development engine 144 may generate a user model that infers future user behavior. In some embodiments, the user model may use trained machine learning algorithms to generate the user model based on the captured user interactions.

At block 2210, the development engine 144 may modify one or more weight values assigned to one or more variants based on the user model generated in block 2208. In doing so, the development engine 144 may generate or modify rules for the rules engine 140 that control delivery of cards to the client.

At block 2212, the development engine 144 may output information to the rules engine 140. In some embodiments, the information may include rules, rulesets, or commands to change rules or rulesets in accordance with the weight values modified in block 2210.

FIG. 23 is a flow diagram of an example process 2300 performed at least in part by the development engine 144 for enabling the developer to modify weight values of variants that impact the generation of rules enforced by the rules engine 140 in accordance with a report of user interactions made via the UE 102.

At block 2302, the development engine 144 may capture user interactions with the UE 102. Non-limiting examples of interactions may include user experience delivery, views, click-through rates, overall usage of card over a time interval, or detailed per-card usage on a per-device basis.

At block 2304, the development engine 144 may deposit the data of the user interactions into the cache 137. In some embodiments, the data may include unique and/or non-unique facts as described herein and may be made available to one or more of the card engine 132, facts controller 136, and/or rules engine 144.

At block 2306, the development engine 144 may perform real-time analysis of the user interaction data. In some embodiments, the analysis may relate to user interactions that may indicate user behavior, e.g., with respect to particular cards (such as, and without limitation, which cards were delivered to a user, which cards were viewed by the user, and/or which cards were dismissed by the user).

At block 2308, the development engine 144 may report results of the analysis to the developer via the developer computing device 142 or by any other way. The results may be provided in graphic, textual, or any other form or forms.

At block 2310, the development engine 144 may receive information to modify weight values assigned to variants. In some embodiments, the information may be received in whole or in part from the developer via the developer application 1330 using any of the techniques described with respect to FIG. 15-FIG. 20.

At block 2312, the development engine 144 may output information corresponding to the information to modify weight values assigned to variants in block 2310. In some embodiments, the information is output to the rules engine 140 to be enforced.

Figure 24:
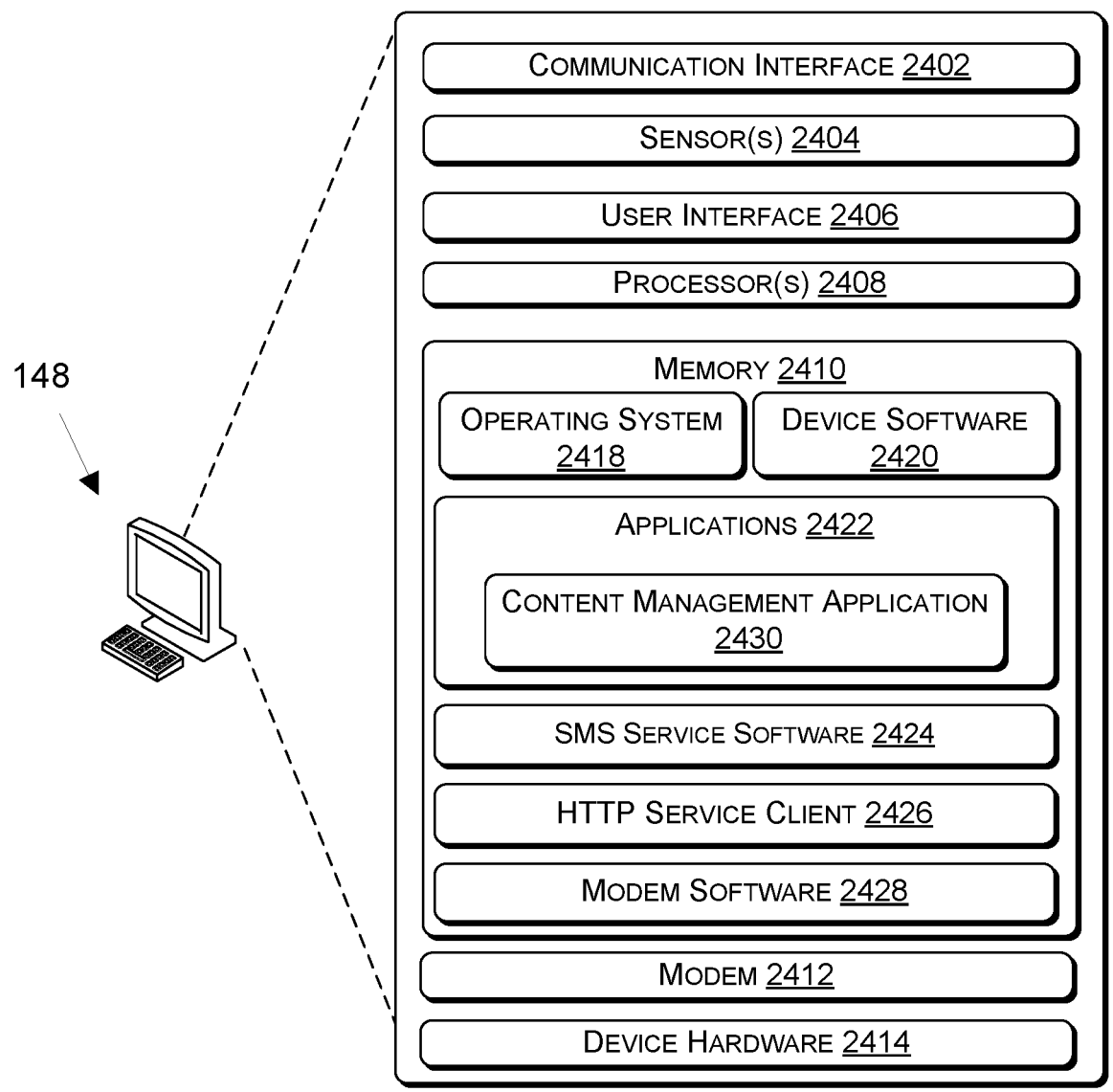
FIG. 24 is a block diagram showing various components of an illustrative content manager's computing device.

FIG. 24 is a block diagram showing various components of an illustrative content manager's computing device 148. The content manager's computing device 148 is in many respects analogous to the UE 102 and the developer's computing device 142, and may include a communication interface 2402, one or more sensors 2404, a content manager interface 2406, one or more processors 2408, memory 2410, a modem 2412, device hardware 2414, an operating system 2418, device software 2420, one or more applications 2422, SMS software 2424, a HTTP service client 2426, and modem software 2428. The one or more applications 2422 may include a content manager application 2430. The illustrated components may function in a manner similar to their corresponding components shown in FIG. 2 and FIG. 13 and described herein. Thus, to the extent that such a description of the manager's computing device 148 would be essentially redundant, the description is not repeated here.

The content manager application 2430 may support an intuitive content manager interface by which a content manager may manage group and card definitions, perform access control, deploy cards to test, collect metrics (including metrics specific to development), determine test success, and provide data for various reports. The content manager also may create, update, and/or delete relational metadata that links content held in relational databases with the content manager application 2430. For example and without limitation, the content manager application 2330 may enable a content manager to create, modify, and delete relational metadata that links existing content to create structured content utilized at least by the card engine 132, rules engine 140, and development engine 144 in ultimately generating and modifying cards and card containers.

To this end, content may be stored in one or more databases in a structured manner. In relational databases, for example, content may be organized in tables by rows and columns. In one example, a table may contain in one cell a reference to another table. In another example, the same column in two different tables may relate the two tables together by the column name as a key. The structure imparted to data stored in relational databases may have rules including constraints on data integrity (e.g., no cell may have a zero value), referential constraints (e.g., a column value in one table may not reference a corresponding column in another table that does not have a record with that value), constraints on data type, etc. All such rules are defined for the database and known as the database schema.

Relational databases store and provide access to not only data but also metadata in a structure called a data dictionary or system catalog. A type of metadata known as relational metadata may link two documents, tables, object to table, etc. in a relational database or between relational databases. For example, relational metadata may include one or more of tables of other tables, such as tables of columns in each database, identifiers of the tables in which a column is used, one or more of structure (rows, columns), schema indexes, functions, procedures, triggers, rules, permissions, and history (version). Relational metadata thus may provide content creators with control over metadata.

Figure 25:
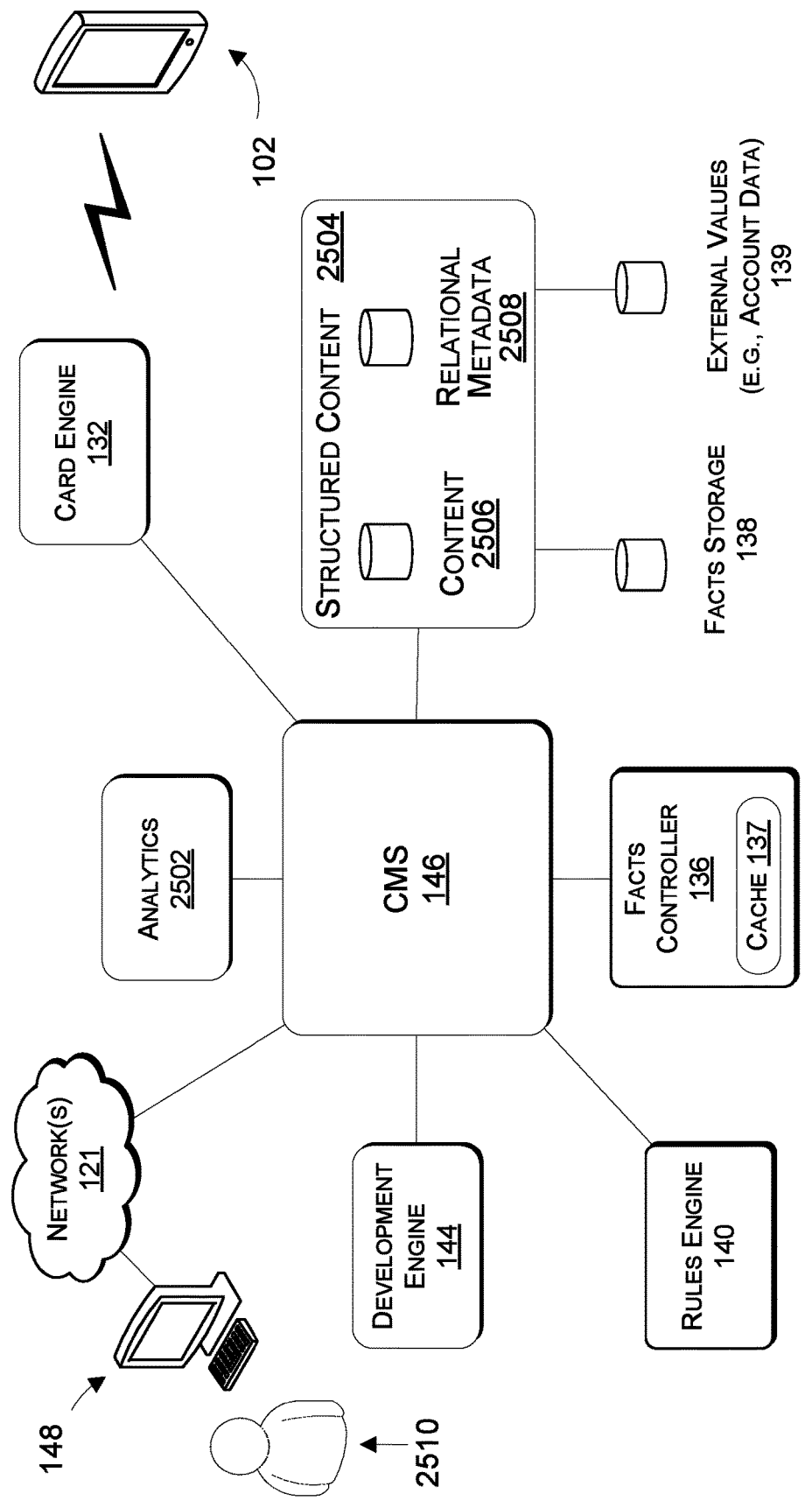
FIG. 25 illustrates an example system, including a content management system, to manage content in the network architecture.

FIG. 25 illustrates an example system 2500, including the CMS 146, to manage content in the network architecture 100. The structure, functions, and techniques implemented by the CMS 146 illustrated and described with respect to FIG. 25 and related figures are not limited to the specific embodiments disclosed herein.

As illustrated in FIG. 25, the CMS 146 may support the card engine 132 together with one or more of the facts controller 136, the rules engine 140, the development engine 144, and an analytics engine 2502. Structured content ("chunks") 2504 may be created from content 2506 and relational metadata 2508. The relational metadata 2508 relates cards in containers, containers within containers, templates, etc. by their common themes such that content changed in one card may change corresponding content in all other cards grouped according to the same theme. For example, a change to a variant (e.g., color, font, shape of a banner) in one card may change the variant in all other cards of the same set in real time. Such changes may be limited within a container or set of cards by setting restrictions in accordance with rules.

Similarly, in the context of customer service provided by a customer service representative 2510, various permutations of groupings of cards or groupings of containers may be identified by a UUID or GUID, changed dynamically, and in turn dynamically rehydrated by the customer service representative 2510 using the identifier to recover the groupings.

In some embodiments of a test environment, for example an A/B test environment, multiple serial changes may be made and the individual or combined effects viewed essentially instantly, thus speeding analysis and decision-making. Further, in some embodiments, information received from users via UE 102 may be captured and used to modify rules enforced by the rules engine 140 in generating card definitions. Artificial intelligence, including machine learning techniques, may assist in the way that the rules engine utilizes such information to modify rules. Such information may also be used to update in real time a user's billing, account status and other data relevant to various reports distributed to interested parties in accordance with business logic and created via the analytics engine 2502. In some embodiments, changes made to the content 2506 and/or the relational metadata 2508 may be tracked (versioned) so that undesired effects resulting from such changes may be rolled back, particularly after publication.

In some embodiments, the content 2506 and the relational metadata 2508 may be stored in different databases as illustrated in FIG. 25, but they may be stored in the same database (for example, in chunks). The relational metadata 2508 may also be brought together with the content 2506 on the fly with changes to the content 2506 and/or the relational metadata 2508 reflected in structured content 2504 substantially instantly as the relational metadata 2508 need not be stored hierarchically. That is, in embodiments described herein, the relational metadata 2508 need not be stored hierarchically, but may be stored in, e.g., tables and other data structures, including but not limited to data structures commonly or newly used in relational and/or other databases as suitable in any particular architecture and/or environment.

Non-hierarchical storage of the relational metadata 2508 represents an improvement over metadata of hierarchically stored data as changes to hierarchically stored data may require each page (in the case of a website) or other presentation unit, or at least the changes thereto, to be replicated individually, a considerably more cumbersome, time-consuming, and resource-intensive way to propagate such changes. In contrast and by way of example, in accordance with some embodiments described herein, chrome content (visual design elements) or chunks of related content may be surfaced on the fly via cards across multiple channels and propagated without need to update each corresponding chunk/field in each database (e.g., each record), and thus each card, individually.

Cards may be selected by, for example, by one or more of audience, channel, customer information, tag, access permission level, indeed any rule of business logic. In accordance with the selection, the parties who have or are intended to have the content may receive content changes in accordance with the relationships that the relational metadata 2508 may establish and take advantage of to achieve advantages described herein and other advantages as well.

In accordance with one or more embodiments described herein, the CMS 146 may generate eligible cards in accordance with the relational metadata 2508 and facts retrieved from the facts storage 138 and/or external (e.g., third party) content or values from the external source 139, and in accordance with rules generated by the rules engine 140 as described herein. The facts may be selected by a developer, found by search, and/or automatically selected by the CMS 146 based on artificial intelligence and machine learning techniques, e.g., fueled by a user behavior analysis via the analytics engine 2502 in accordance with techniques described herein.

Referring back to FIG. 15 and FIG. 16, the offer card "Cell X9 Offer Q418 Card" may be revised or added for possible presentation on android devices using the CMS 146. Under "Controls," it can be seen that two controls are available (how long to display the offer (i.e., until 12:30 pm on Dec. 31, 2019) and what devices are eligible (android devices)). Although two controls are shown, any number may be available based on card creation by a developer, editor, and/or automatically via the CMS 146, etc. Modifications (e.g., adding, amending, and/or deleting content) to the offer card is essentially immediately propagated to be published to all devices in a test environment or consumer environment, or in any other environment consistent with embodiments described herein. Notably, the common schema such as is also described herein makes the propagation of individual facts and changes thereto (e.g., changing the language displayed to one or more users in accordance with user preference) simpler and more efficient as only one change effects corresponding changes through all devices of interest.

Figure 26:
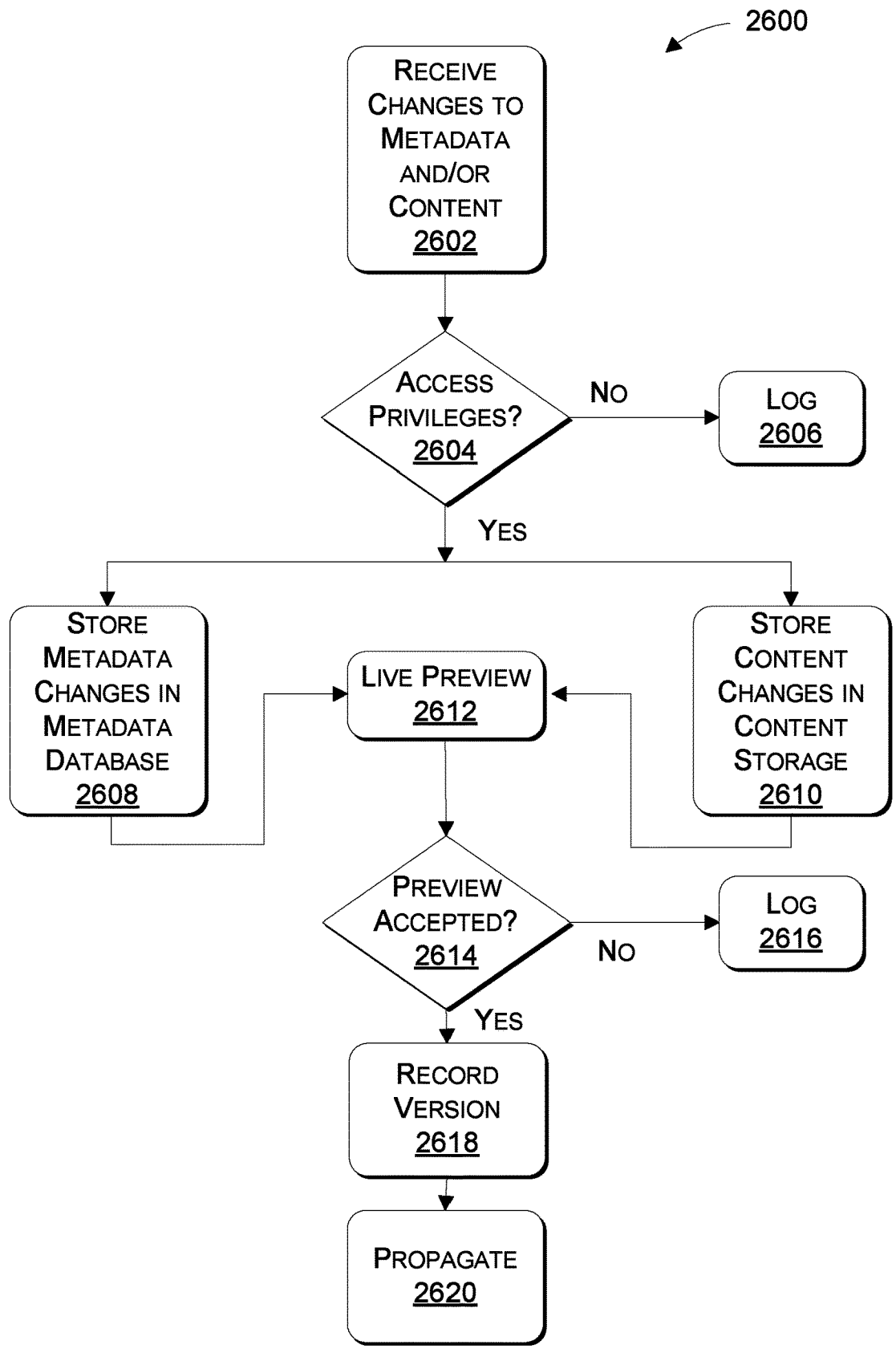
FIG. 26 is a flow diagram of an example process performed at least in part by the content management system for managing and propagating content described and linked by relational metadata in response to receiving new content or updates to content in accordance with the common schema.
Figure 27:
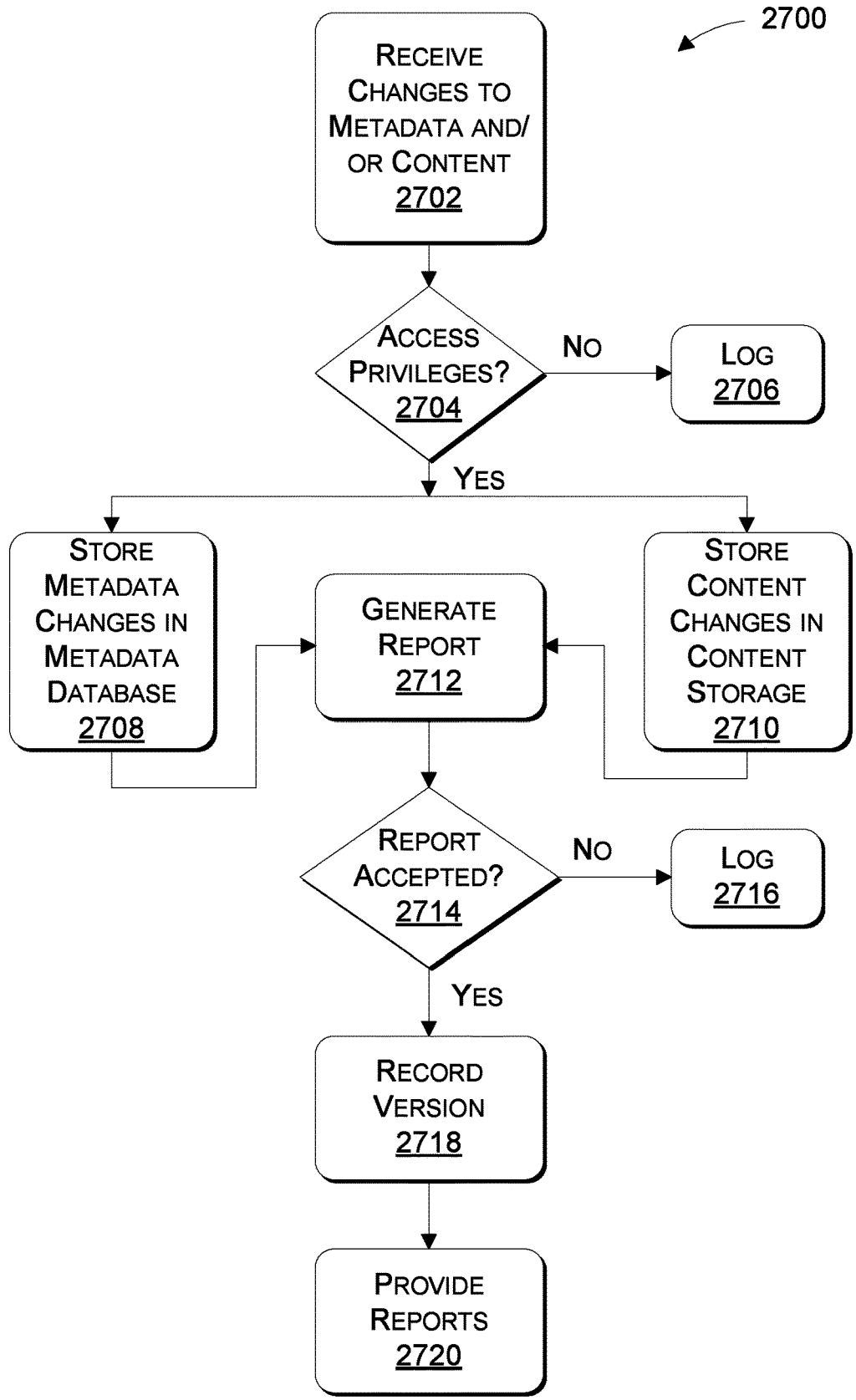
FIG. 27 is a flow diagram of an example process performed at least in part by the content management system for managing content described and linked by relational metadata in response to receiving new content or updates to content in accordance with the common schema.

FIG. 26 and FIG. 27 present illustrative processes for implementing the CMS 146. The processes are illustrated respectively as a collection of blocks in a logical flow chart, which represents a sequence of operations that can be implemented in hardware, software, or a combination thereof. In the context of software, the blocks represent or correspond to computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the network architecture 100 of FIG. 1 and the system architecture of FIG. 21.

FIG. 26 is a flow diagram of an example process performed at least in part by the CMS 146 for managing and propagating content described and linked by relational metadata in response to receiving new content or updates to content in accordance with the common schema.

At block 2602, the CMS 146 may receive changes to the relational metadata 2508 and/or the content 2506. In some embodiments, the changes may be made by a content manager using the content manager's computing device 148 and may be made via an interface corresponding to the developer interface screens 1500, 1600, 1700, 1800, 1900 and/or 2000. For example, changes to fact metadata (including relational metadata 2508) or content (including content 2506), including modifications, additions, or deletions, accessed in accordance with access privileges set by the developer, content manager, rules engine, etc. may be reflected in cards having the related facts and in turn the selection of cards to be surfaced or not surfaced.

At block 2604, the CMS 146 may determine whether the entity requesting the changes has sufficient access privileges. If the entity has insufficient access privileges, the process 2600 may proceed to block 2606 at which a log of the effort may be created. Then, the process 2600 may end.

If, at block 2604, the CMS 146 determines that the requesting entity has sufficient access privileges, the process 2600 may proceed to store metadata changes at block 2608 and/or store content changes at block 2610, depending on the kind of changes requested. Stored metadata changes may include changes to the relational metadata 2508 that may link content in multiple tables, etc. In accordance with embodiments described herein, changes to the relational metadata 2508 may affect one or more of rule settings, rules enforcement, card variants, facts, sub-facts, and ultimately cards and which cards are to be surfaced. In a larger sense, the changes to relational metadata 2508 may dynamically change the groupings of cards and/or containers with potential changes in corresponding rules and rules enforcement. Moreover, utilizing a non-hierarchical organization of the relational metadata 2508 makes such changes possible on the fly for various purposes, including but not limited to testing, publishing, analysis, and reporting.

At block 2612, the CMS 146 may enable a live preview of the modified structured content 2504 (i.e., content 2506 available to the card engine with its relational metadata 2508). In some examples, the live preview may be made available to developers, content managers, or others in accordance with access privileges.

At block 2614, the CMS 146 may receive an indication from the observer of the live preview as to whether the previewed content is accepted. If the previewed content is not accepted, then the process 2600 may proceed to block 2616, at which a log is made of the disapproval and the process 2600 may end.

If, at block 2614, the CMS 146 receives an indication that the previewed content is accepted, then the process 2600 may proceed to block 2618, at which the CMS 146 may record the version of the structured content 2504 corresponding to the changes made. Versioning permits rollback of changes to an earlier version should the changes yield undesirable results, whether in testing, publishing, or at any other time.

At block 2620, the changes to the content 2506 and/or relational metadata 2508 may be propagated as structured content via the relational metadata 2508. That is, the changes may be reflected in new structured content 2504 for the card engine 132 and/or the rules engine 140 to generate cards, card definitions, containers, and/or container definitions in accordance with updated, new, or deleted facts, variants, rules, etc. resulting from the changes reflected through the relational metadata 2508.

FIG. 27 is a flow diagram of an example process performed at least in part by the CMS 146 for managing content described and linked by relational metadata in response to receiving new content or updates to content in accordance with the common schema. In some embodiments described in FIG. 27 and elsewhere herein, reports may be generated of effects that ultimately result from the new content and updates for consumption by automated and/or individual entities.

At block 2702, the CMS 146 may receive changes to the relational metadata 2508 and/or the content 2506. In a similar way to block 2602 described above, in some embodiments, the changes may be made by a content manager using the content manager's computing device 148 and may be made via an interface corresponding to the developer interface screens 1500, 1600, 1700, 1800, 1900, and/or 2000. For example, changes to fact metadata (e.g., relational metadata 2508) or content (e.g., content 2506), including modifications, additions, or deletions, accessed in accordance with access privileges set by the developer, content manager, rules engine, etc. may be reflected in cards having the related facts and in turn the selection of cards to be surfaced or not surfaced.

At block 2704, the CMS 146 may determine whether the entity requesting the changes has sufficient access privileges. If the entity has insufficient access privileges, the process 2700 may proceed to block 2706 at which a log of the effort may be created. Then, the process 2700 may end.

If, at block 2704, the CMS 146 determines that the requesting entity has sufficient access privileges, the process 2700 may proceed to store metadata changes at block 2708 and/or store content changes at block 2710, depending on the kind of changes requested. As described above with respect to the process 2600, stored metadata changes may include changes to the relational metadata 2508 that may link content in multiple tables, etc. In accordance with embodiments described herein, changes to the relational metadata 2508 may affect one or more of rule settings, rules enforcement, card variants, facts, sub-facts, and ultimately cards and which cards are to be surfaced. In a larger sense, the changes to the relational metadata 2508 may dynamically change the groupings of cards and/or containers with potential changes in corresponding rules and rules enforcement. Moreover, utilizing a non-hierarchical organization of the relational metadata 2508 makes such changes possible on the fly for various purposes, including but not limited to testing, publishing, analysis, and reporting.

At block 2712, the CMS may generate one or more reports based on the modified and/or new structured content 2504. In some embodiments, the reports may be based on user behavior, account status, business logic, and/or any other metric relevant to various use cases that may include but are not limited to testing, financial reporting, customer service, product promotion, customer feedback, and the like.

At block 2714, the CMS 146 may receive an indication from the observer of the generated report as to whether the report is accepted. If the report is not accepted, then the process 2700 may proceed to block 2716, at which a log is made of the disapproval and the process 2700 may end.

If, at block 2714, the CMS 146 receives an indication that the report is accepted, then the process 2700 may proceed to block 2718, at which the CMS 146 may record the version of the structured content 2504 corresponding to the report. In some embodiments in which the structured content 2504 is used to generate various reports, versioning permits rollback to an earlier version of the structured content 2504. For example, if the modifications to the structured content 2504 yield unreliable reports, the rollback to an earlier, reliable version may prevent interruption in data collection and reporting while troubleshooting is performed.

At block 2720, the CMS 146 may provide the generated report for consumption and/or subsequent processing or analysis. For example and without limitation, the report may take into account user behavior such as CTA clicks or length of time that a card or page is visible to the user, user account information such as UE purchases or account status, and the like. Reports may be provided to the content manager, a developer, and/or the rules engine 140, for example, or to any interested party that has the proper access privileges.

In accordance with one or more of the embodiments described herein, a content management system may support a card engine to dynamically perform operations such as configuring content for display via a user interface and generating reports based on user behavior, account status, and business logic. In cooperation with a facts controller to provide facts that the card engine may access substantively in real time, a rules engine to provide constructs in the form of card definitions, and a development engine, the content management system may enable a content manager to effect changes to card and container definitions by providing or modifying rules and rulesets in the rules engine dynamically. Cards evaluated dynamically by the card engine may be formatted for display via the user interface and transmitted to the UE. In this way, the content manager may make content decisions in accordance with business logic and events occurring proximate to the user, thereby impacting the user experience and generating reports in a substantive and real-time fashion.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A server, comprising:
one or more processors; and
memory to maintain one or more software components comprising instructions that are executable by the one or more processors, the one or more software components comprising:
a content management system configured to:
receive changes to relational metadata that describe content;
determine that a source of the relational metadata changes has sufficient access privileges to effect the relational metadata changes;
in response to determining that the source has sufficient access privileges to effect the relational metadata changes:
store the relational metadata changes in one or more relational databases;
form structured content that corresponds to the changes to the relational metadata and content described by the changed relational metadata;
record a version of the structured content; and
propagate the structured content to one or more mobile devices;
wherein the relational metadata are stored in a non-hierarchical configuration in the one or more relational databases.

2. The server of claim 1, wherein the content management system is configured to:
enable a live preview of the structured content before being propagated to the one or more mobile devices;
receive an indication as to whether the live preview is accepted;
log a failure in response to receiving the indication that the live preview is not accepted; and
record the version of the structured content and propagate the structured content to the one or more mobile devices in response to receiving the indication that the live preview is accepted.

3. The server of claim 1, wherein:
the one or more relational databases hold at least two tables that reference content;
the at least two tables are linked by the relational metadata;
the content referenced by the at least two tables is linked by the relational metadata; and
the changes to the relational metadata effect changes to the content in the structured content propagated to the one or more mobile devices.

4. The server of claim 1, wherein the structured content is propagated as cards surfaced by a card engine.

5. The server of claim 1, wherein the changes to the relational metadata include changes to access privileges.

6. The server of claim 1, wherein the content management system is configured to:
store changes to the content in content storage;
wherein the structured content corresponds to the changes made to the relational metadata and the changes made to the content.

7. A computer-implemented method for managing content, comprising:
receiving changes to relational metadata that describe content;
determining whether a source of the relational metadata changes has sufficient access privileges to effect the relational metadata changes;
in response to determining that the source has insufficient access permissions to effect the changes, logging a failure; and
in response to determining that the source has sufficient access privileges to effect the relational metadata changes:
storing the relational metadata changes in one or more relational databases;
forming structured content that corresponds to the changes to the relational metadata and content described by the changed relational metadata;
recording a version of the structured content changes; and
providing, as the structured content, a report showing results from the relational metadata changes;
wherein the relational metadata are stored in a non-hierarchical configuration in the one or more relational databases.

8. The method of claim 7, further comprising:
generating the report;
receiving an indication as to whether the generated report is accepted;
logging a failure in response to receiving the indication that the generated report is not accepted; and
recording the version of the generated report and providing the generated report as the provided report in response to receiving the indication that the generated report is accepted.

9. The method of claim 7, wherein:
the one or more relational databases hold at least two tables that reference content;
the at least two tables are linked by the relational metadata;
the content referenced by the at least two tables is linked by the relational metadata; and
the changes to the relational metadata effect changes to the content in the structured content reflected in the generated report.

10. The method of claim 9, further comprising:
propagating the structured content to one or more mobile devices as cards surfaced by a card engine; and
receiving feedback related to the surfaced cards;
wherein the report reflects the feedback.

11. The method of claim 10, further comprising:
analyzing the feedback for user behavior related to the surfaced cards;
wherein the report reflects results of the analysis.

12. The method of claim 10, further comprising:
analyzing the feedback for financial reporting data;
wherein the report reflects results of the analysis.

13. The method of claim 7, further comprising:
storing changes to the content in content storage;
wherein the structured content corresponds to the changes made to the relational metadata and the changes made to the content.

14. A computer-readable storage medium comprising instructions that, when executed by one or more computing devices, cause the computing devices to implement a content management system to perform operations comprising:
receiving changes to relational metadata that describe content;
determining whether a source of the relational metadata changes has sufficient access privileges to effect the relational metadata changes;
in response to determining that the source has insufficient access permissions to effect the relational metadata changes, logging a failure; and
in response to determining that the source has sufficient access privileges to effect the relational metadata changes:
storing the relational metadata changes in one or more relational databases;
forming structured content that corresponds to the changes to the relational metadata and content described by the changed relational metadata;
recording a version of the structured content; and
propagating the structured content to one or more mobile devices;
wherein the relational metadata are stored in a non-hierarchical configuration in the one or more relational databases.

15. The computer-readable storage medium of claim 14, wherein the operations further comprise:
enabling a live preview of the structured content before being propagated to the one or more mobile devices;
receiving an indication as to whether the live preview is accepted;
logging a failure in response to receiving the indication that the live preview is not accepted; and
recording the version of the structured content and propagating the structured content to the one or more mobile devices in response to receiving the indication that the live preview is accepted.

16. The computer-readable storage medium of claim 14, wherein the operations further comprise:
generating, as the structured content, a report resulting from the relational metadata changes;
receiving an indication as to whether the generated report is accepted;
logging a failure in response to receiving the indication that the generated report is not accepted; and
recording the version of the generated report and providing the generated report in response to receiving the indication that the generated report is accepted.

17. The computer-readable storage medium of claim 14, wherein:
the one or more relational databases hold at least two tables that reference content;
the at least two tables are linked by the relational metadata non-hierarchically;
the content referenced by the at least two tables is linked by the relational metadata; and
the changes to the relational metadata effect changes to the content in the structured content propagated to the one or more mobile devices.

18. The computer-readable storage medium of claim 14, wherein the operations further comprise:
storing changes to the content in content storage;
wherein the structured content corresponds to the changes made to the relational metadata and the changes made to the content.

* * * * *